(12) United States Patent
Fujii et al.

(10) Patent No.: US 12,500,302 B2
(45) Date of Patent: Dec. 16, 2025

(54) POWER SOURCE DEVICE, AND VEHICLE AND POWER STORAGE DEVICE EACH EQUIPPED WITH SAME

(71) Applicant: SANYO Electric Co., Ltd., Osaka (JP)

(72) Inventors: Yusuke Fujii, Aichi (JP); Yoshimitsu Tashiro, Hyogo (JP); Takuya Egashira, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 597 days.

(21) Appl. No.: 17/906,882

(22) PCT Filed: Jan. 20, 2021

(86) PCT No.: PCT/JP2021/001788
§ 371 (c)(1),
(2) Date: Sep. 21, 2022

(87) PCT Pub. No.: WO2021/199596
PCT Pub. Date: Oct. 7, 2021

(65) Prior Publication Data
US 2023/0246274 A1 Aug. 3, 2023

(30) Foreign Application Priority Data
Mar. 31, 2020 (JP) .................. 2020-064067

(51) Int. Cl.
*H01M 50/204* (2021.01)
*H01M 10/44* (2006.01)
(Continued)

(52) U.S. Cl.
CPC ......... *H01M 50/204* (2021.01); *H01M 10/44* (2013.01); *H01M 50/262* (2021.01); *H01M 50/505* (2021.01); *H01M 2220/20* (2013.01)

(58) Field of Classification Search
CPC ............ H01M 50/204; H01M 50/262; H01M 50/209; H01M 50/30; H01M 50/271
See application file for complete search history.

(56) References Cited

U.S. PATENT DOCUMENTS

2013/0183544 A1  7/2013  Yoshioka et al.
2014/0335386 A1  11/2014  Keya et al.
(Continued)

FOREIGN PATENT DOCUMENTS

JP  2013-168355  8/2013
JP  2014-099354  5/2014
(Continued)

OTHER PUBLICATIONS

International Search Report of PCT application No. PCT/JP2021/001788 dated Mar. 30, 2021.

*Primary Examiner* — Sarah A. Slifka
(74) *Attorney, Agent, or Firm* — WHDA, LLP

(57) ABSTRACT

Power source device includes: battery stack in which a plurality of battery cells are stacked; a pair of end plates that each have a plate shape having a main surface and a side surface intersecting the main surface, are formed with plate screw hole on the side surface, and are arranged on both side end surfaces of battery stack; a plurality of fastening members that are extended in stack direction of the battery stack, have fastening screw holes opened at ends, and couple end plates to each other; and bolt that is inserted into fastening screw hole of each fastening member and plate screw hole of end plate to fix the fastening member to end plate. The fastening member includes plate-shaped fastening body, intermediate part obtained by bending both ends of fastening body, and coupling piece obtained by bending an end of intermediate part far from fastening body to provide a height difference from fastening body and form fastening screw hole.

9 Claims, 17 Drawing Sheets

(51) Int. Cl.
*H01M 50/262* (2021.01)
*H01M 50/505* (2021.01)

(56) References Cited

U.S. PATENT DOCUMENTS

| | | |
|---|---|---|
| 2016/0141737 A1 | 5/2016 | Kubota et al. |
| 2017/0237055 A1 | 8/2017 | Shimizu et al. |
| 2018/0123199 A1 | 5/2018 | Kubota et al. |
| 2021/0066690 A1 | 3/2021 | Gondoh |

FOREIGN PATENT DOCUMENTS

| | | |
|---|---|---|
| JP | 2014-220149 | 11/2014 |
| JP | 2014-238928 | 12/2014 |
| JP | 2017-016799 | 1/2017 |
| JP | 2017-069069 | 4/2017 |
| WO | 2016/136193 | 9/2016 |
| WO | 2019/176415 | 9/2019 |

POWER SOURCE DEVICE, AND VEHICLE AND POWER STORAGE DEVICE EACH EQUIPPED WITH SAME

CROSS-REFERENCE TO RELATED APPLICATIONS

This application is a U.S. national stage application of the PCT International Application No. PCT/JP2021/001788 filed on Jan. 20, 2021, which claims the benefit of foreign priority of Japanese patent application No. 2020-064067 filed on Mar. 31, 2020, the contents all of which are incorporated herein by reference.

TECHNICAL FIELD

The present disclosure relates to a power source device, and vehicle and an electrical storage device each equipped with the same.

BACKGROUND ART

A power source device such as a battery module or a battery pack including a plurality of battery cells is used as a power source for a vehicle such as a hybrid vehicle or an electric car, a power source for a power storage system for a factory, a home, or the like (see PTL 1, for example).

Such a power source device has a plurality of chargeable and dischargeable battery cells that are stacked. For example, as shown in the exploded perspective view in FIG. 21, in power source device 900, end plate 903 is disposed on each of both end surfaces of battery stack 910 in which battery cell 901 with a prismatic outer covering can and insulating spacer 902 are alternately stacked, and end plates 903 are fastened to each other with metallic bind bar 904. Each bind bar 904 is fixed to end plate 903 by bolt 905.

When the battery cell is repeatedly charged and discharged, the outer covering can swells and contracts. In particular, with the recent demand for higher capacity, the capacity of each secondary battery cell is increasing. As a result, the swelling amount tends to increase. In a battery stack in which a large number of such secondary battery cells are stacked and fastened, the swelling force of the secondary battery cells increases, and the swelling amount also increases in accordance with the number of secondary battery cells. The bind bar is also required to have high rigidity so as to cope with such swelling of the secondary battery cell.

However, there has been a concern that the battery stack is deformed due to swelling of the battery cells, and bolt slippage occurs at the fastening part between the bind bar and the end plate. That is, as shown in FIG. 22, upon receiving the cell swelling force of battery cell 1, a force in the shearing direction occurs in the fastening part between bind bar 904 and bolt 905. When this force exceeds the frictional force, bolt slippage occurs. When the fastening part is loosened due to bolt slippage, a fixed state between bind bar 904 and end plate 903 is impaired, which is not preferable.

CITATION LIST

Patent Literature

PTL 1: Unexamined Japanese Patent Publication No. 2017-16799

SUMMARY OF THE INVENTION

An object of one aspect of the present invention is to provide a power source device that suppresses occurrence of bolt slippage and enhances safety, and a vehicle and an electrical storage device equipped with the power source device.

A power source device according to an aspect of the present invention includes: a battery stack in which a plurality of battery cells are stacked, each battery cell having a gas discharge valve that opens when an internal pressure of an outer covering can rises and an electrode terminal formed on an upper surface; a pair of end plates that have a plate shape having a main surface and a side surface intersecting the main surface, are formed with a plate screw hole on a side surface, and are arranged on both end surfaces of the battery stack; a plurality of fastening members that are extended in a stack direction of the battery stack, have fastening screw holes opened at ends, and couple the end plates to each other; and a bolt that is inserted into a fastening screw hole of each fastening member and a plate screw hole of the end plate to fix the fastening member to the end plate, in which the fastening member includes a fastening body in a plate shape, an intermediate part in which both ends of the fastening body are bent, and a coupling piece that is provided with a height difference from the fastening body by bending an end of the intermediate part far from the fastening body, and that is formed with the fastening screw hole.

According to a power source device according to an aspect of the present invention, even when the battery stack swells and contracts, the swelling and contraction are absorbed by two bent parts with the intermediate part interposed therebetween, occurrence of bolt slippage can be suppressed, and hence the fixed state between the fastening member and the end plate can be maintained with high reliability.

DESCRIPTION OF EMBODIMENT

Figure 1:
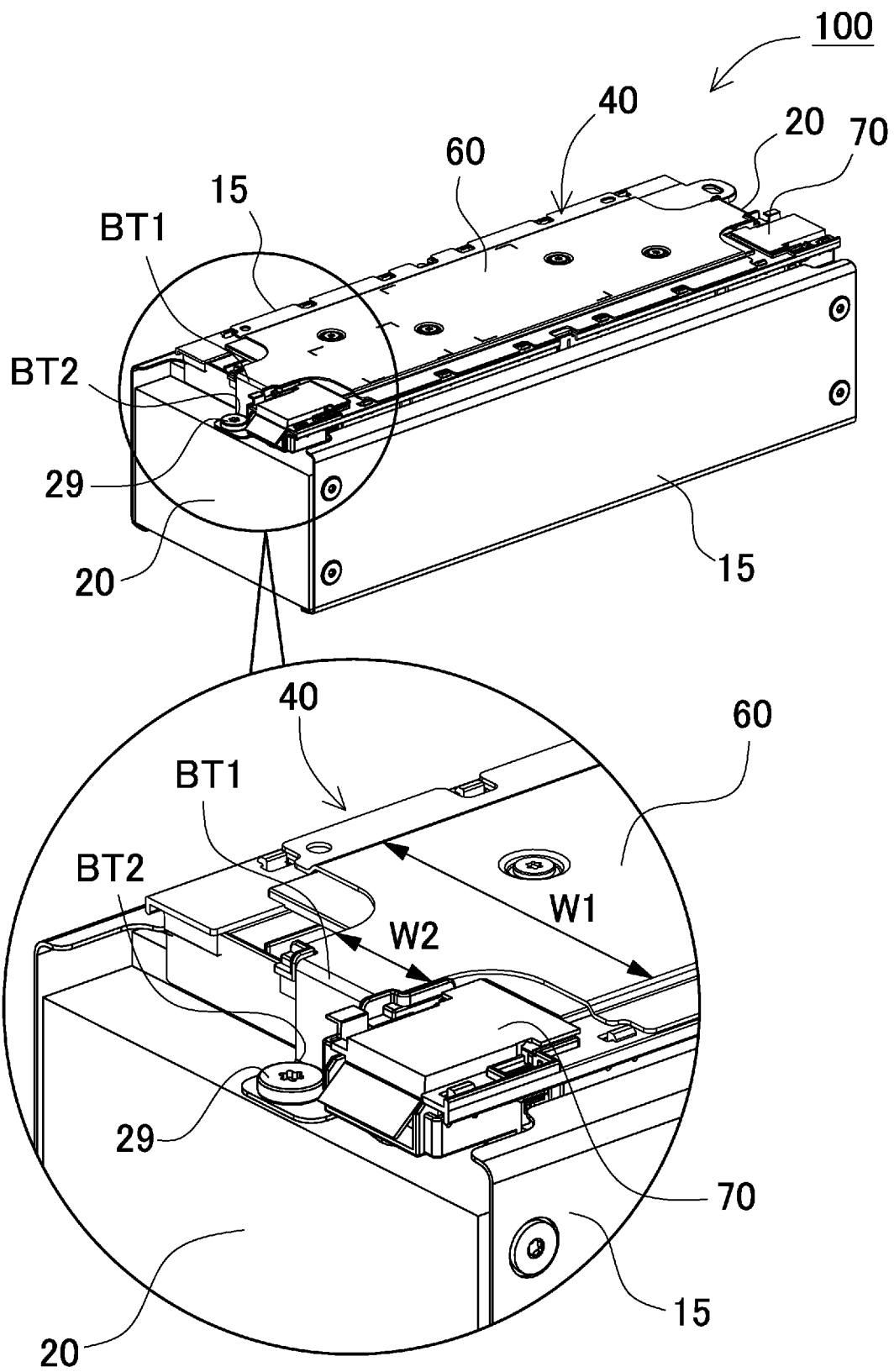
FIG. 1 is a perspective view showing a power source device with an enlarged view of a main part according to a first exemplary embodiment of the present invention.

Exemplary embodiments of the present invention may be specified by the following configurations.

In a power source device according to an exemplary embodiment of the present invention includes, in addition to the above configuration, the fastening body and the coupling piece are arranged in parallel with different heights.

In a power source device according to another exemplary embodiment of the present invention, in addition to any of the configurations described above, the fastening member is formed such that the coupling piece is narrower in width than the fastening main surface. The above configuration can reduce the section modulus, and can suppress a situation in which deformation due to swelling and contraction of the battery stack reaches the coupling piece.

A power source device according to another exemplary embodiment of the present invention further includes, in addition to any of the configurations described above: a first cover that is provided on an upper surface of the battery stack and opens at a position corresponding to the gas discharge valve; and a second cover that is provided on an upper surface of the first cover and defines a gas duct with the first cover, in which the fastening member includes a metallic third cover that is provided on an upper surface of a second cove and abuts on an upper surface of the second cover. With the above configuration, even if high-temperature, high-pressure gas is discharged from the gas discharge valve, the metallic third cover that reinforces the upper surface of the second cover to suppress deformation of the second cover can also be used as the fastening member.

Furthermore, in a power source device according to another exemplary embodiment of the present invention, in addition to any of the configurations described above, the gas duct forms a baffle plate between the first cover and a second cover. With the above configuration, by reinforcing the upper surface of the second cover with the metallic third cover, even if a high-temperature, high-pressure gas is discharged from a gas discharge valve, it is possible to suppress deformation of the second cover, and avoid a situation in which an unintended gas discharge path avoiding a baffle plate is formed.

Furthermore, in a power source device according to another exemplary embodiment of the present invention, in addition to any of the configurations described above, the third cover is fixed to the end plate. The above configuration makes it possible to firmly fix the third cover to the power source device using the end plate, and the third cover can prevent deformation of the second cover.

Furthermore, a power source device according to another exemplary embodiment of the present invention further includes, in addition to any of the configurations described above, a bus bar that connects electrode terminals of the battery cells constituting the battery stack; and a total terminal strip that is connected to the bus bar, in which the third cover forms an exposure part that exposes the total terminal strip. With the above configuration, it is possible to secure the insulation distance by separating from the total terminal strip while using the metallic third cover, and to avoid the possibility of occurrence of an unintended short circuit.

Furthermore, in a power source device according to another exemplary embodiment of the present invention, in addition to any of the configurations described above, the third cover forms a bead. With the above configuration, the strength can be improved by simple processing of forming a bead on the third cover.

Furthermore, an electric vehicle according to a still another exemplary embodiment of the present invention includes: any one of the above-described power source devices; a travel motor to which electric power is supplied from the power source device; a vehicle main body on which the power source device and the motor are mounted; and wheels that are driven by the motor to make the vehicle main body travel.

Furthermore, an electrical storage device according to another exemplary embodiment of the present invention includes any of the above power source devices and a power supply controller that controls charging and discharging of the power source device, in which the power supply controller enables charging of the plurality of battery cells with electric power from outside, and controls charging to be performed on the plurality of battery cells.

Exemplary embodiments of the present invention will be hereinafter described with reference to the drawings. However, the exemplary embodiments described below are examples for embodying the technical idea of the present invention, and the present invention is not limited to the following. In the present description, members indicated in the claims are not specified at all to the members of the exemplary embodiments. In particular, the dimensions, materials, shapes, and relative arrangement of the constituent members described in the exemplary embodiments are not intended to limit the scope of the present invention only thereto unless otherwise specified and are merely illustrative examples. The sizes and positional relationships of the members shown in the drawings may be exaggerated for clarity of description. In the following description, the same names and reference marks indicate the same or similar members, and detailed description will be appropriately omitted. The elements constituting the present invention may be configured such that the plurality of elements are constituted of the same members to form one member that functions as a plurality of elements, or conversely, the function of one member can be shared and achieved by a plurality of members. The description in some examples or exemplary embodiments may be applied to other examples, exemplary embodiments, and the like.

The power source device according to the exemplary embodiments is used in various applications including a power source to be equipped on a hybrid vehicle, an electric car, or other electric vehicles to supply electric power to a drive motor, a power source that stores power generated by natural energy such as solar power generation and wind power generation, and a power source for storing midnight electric power, and in particular, used as a power source suitable for large-power, large-current applications. In the following example, the exemplary embodiments applied to a power source device for driving an electric vehicle will be described.

First Exemplary Embodiment

Figure 2:
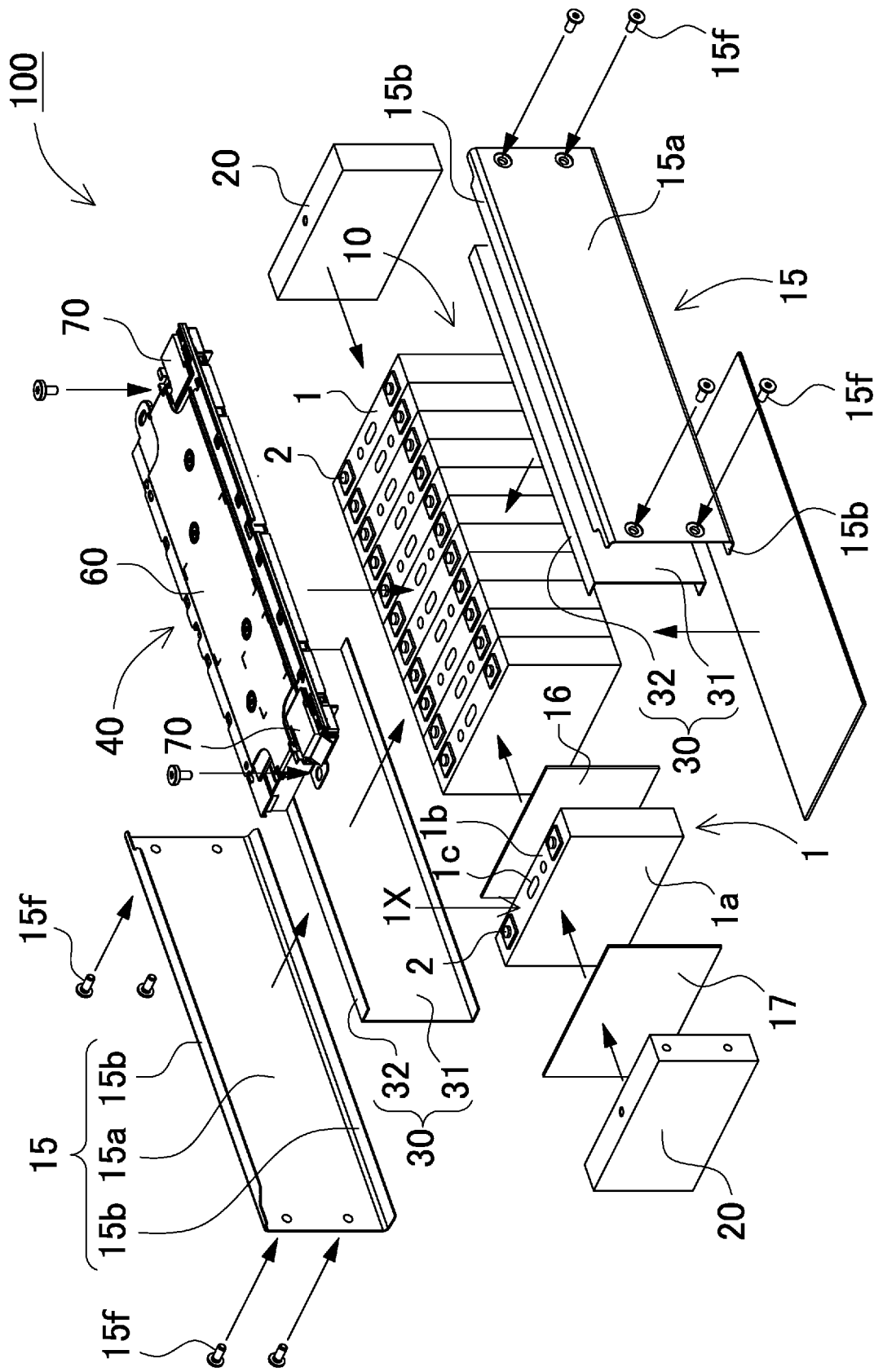
FIG. 2 is an exploded perspective view of the power source device shown in FIG. 1.

Power source device 100 according to the first exemplary embodiment of the present invention is shown in FIGS. 1 and 2. In these figures, FIG. 1 is an exploded perspective view with an enlarged view of a main part of power source device 100 according to a first exemplary embodiment, and FIG. 2 is an exploded perspective view of power source device 100 shown in FIG. 1.

Power source device 100 shown in these figures includes battery stack 10 in which the plurality of battery cells 1 are stacked, a pair of end plates 20 covering both end surfaces of battery stack 10, a plurality of fastening members 15 for fastening end plates 20 to each other, and cover assembly 40 provided on an upper surface of battery stack 10.

Fastening member 15 is formed into a plate shape extending along a stack direction of the plurality of battery cells 1. Fastening members 15 are arranged on opposite side surfaces of battery stack 10 to fasten end plates 20 to each other.

(Battery Stack 10)

As shown in FIG. 2, battery stack 10 includes the plurality of battery cells 1 each including positive and negative electrode terminals 2, and bus bars connected to electrode terminals 2 of the plurality of battery cells 1 to connect the plurality of battery cells 1 in parallel and in series. The plurality of battery cells 1 are connected in parallel and in series through the bus bars. Battery cells 1 are chargeable and dischargeable secondary batteries. Power source device 100 includes the plurality of battery cells 1 connected in parallel to form a parallel battery group, and a plurality of parallel battery groups are connected in series to allow many battery cells 1 to be connected in parallel and in series. In power source device 100 shown in FIG. 2, the plurality of battery cells 1 are stacked to form battery stack 10. The pair of end plates 20 are arranged on both end surfaces of battery stack 10. Ends of fastening members 15 are fixed to end plates 20 to fix, in a state of being pressurized, battery cells 1 in the stack state.

(Battery Cell 1)

As shown in FIG. 2, battery cell 1 are each a prismatic battery having a width larger than the thickness, in other words, a width smaller than the width, and are stacked in the thickness direction to form battery stack 10. Battery cell 1 can be, for example, a lithium ion secondary battery. The battery cell can be any chargeable secondary battery such as a nickel hydride battery and a nickel cadmium battery. Battery cell 1 houses positive and negative electrode plates in outer covering can 1a having a sealed structure together with an electrolyte solution. Outer covering can 1a includes a metal sheet such as aluminum or an aluminum alloy press-molded into a prismatic shape, and has an opening that is hermetically sealed with sealing plate 1b. Sealing plate 1b is made of the aluminum or aluminum alloy same as prismatic outer covering can 1a, and positive and negative electrode terminals 2 are fixed to both ends of sealing plate 1b. Sealing plate 1b is provided with, between positive and negative electrode terminals 2, gas discharge valve 1c, which is a safety valve that opens in response to a change in pressure inside each battery cell 1.

The plurality of battery cells 1 are stacked such that the thickness of each battery cell 1 is the stack direction to constitute battery stack 10. At this time, the output of battery stack 10 can be increased by making the number of stack layers larger than usual. In such a case, battery stack 10 becomes long by being extended in the stack direction. In battery cell 1, terminal surfaces 1X provided with positive and negative electrode terminals 2 are arranged on the same plane, and the plurality of battery cells 1 are stacked to be battery stack 10. Then, an upper surface of battery stack 10 is a surface provided with gas discharge valves 1c of the plurality of battery cells 1.

(Electrode Terminal 2)

In battery cell 1, as shown in FIG. 2 and the like, with sealing plate 1b, which is a top surface, as terminal surface 1X, positive and negative electrode terminals 2 are fixed to both ends of terminal surface 1X. Electrode terminal 2 has a protrusion having a circular columnar shape. However, the protrusion does not necessarily have to be cylindrical, and may be polygonal or elliptical.

Positive and negative electrode terminals 2 fixed to sealing plate 1b of battery cell 1 are positioned where the positive electrode and the negative electrode become bilaterally symmetrical. Consequently, as shown in FIG. 2, battery cells 1 are horizontally flipped and stacked, and electrode terminals 2 of a positive electrode and a negative electrode that are adjacently close to each other are connected by a bus bar, so that adjacent battery cells 1 can be connected in series. Note that the present invention does not specify the number and connection state of the battery cells constituting the battery stack. The number and connection state of the battery cells constituting the battery stack may be modified in various manners, inclusive of other exemplary embodiments described later.

The plurality of battery cells 1 are stacked such that the thickness direction of each battery cell 1 aligns with the stack direction to constitute battery stack 10. In battery stack 10, the plurality of battery cells 1 are stacked such that terminal surface 1X provided with positive and negative electrode terminals 2 and sealing plate 1b in FIG. 2 become flush with each other.

In battery stack 10, insulating spacer 16 may be interposed between battery cells 1 stacked adjacently to each other. Insulating spacer 16 is produced in the form of a thin plate or sheet with an insulating material such as resin. Insulating spacer 16 has a plate shape that is substantially equal in size to an opposed face of battery cell 1. Such insulating spacer 16 can be stacked between battery cells 1 adjacent to each other to insulate adjacent battery cells 1 from each other. As a spacer arranged between adjacent battery cells, it is possible to use a spacer having a shape in which a flow path for a cooling gas is formed between the battery cell and the spacer. It is also possible to cover a surface of battery cell 1 with an insulating material. For example, the surface of the outer covering can excluding the electrode terminal part of the battery cell may be covered with a shrink film such as a PET resin. In this case, the insulating spacer may be omitted. Although a power source device including a large number of battery cells connected in parallel and series includes an insulating spacer interposed between battery cells connected in series to each other, no voltage difference occurs between adjacent outer covering cans in battery cells connected in parallel to each other, and therefore the insulating spacer between these battery cells can be eliminated.

Power source device 100 shown in FIG. 2 includes end plates 20 arranged on both end surfaces of battery stack 10. Between end plate 20 and battery stack 10, end surface spacer 17 may be interposed to insulate them. End surface spacer 17 can also be produced in the form of a thin plate or sheet with an insulating material such as resin.

In power source device 100 according to the first exemplary embodiment, in battery stack 10 in which the plurality of battery cells 1 are stacked on each other, electrode terminals 2 of the plurality of battery cells 1 adjacent to each other are connected by the bus bar to connect the plurality of battery cells 1 in parallel and in series. A bus bar holder may be disposed between battery stack 10 and the bus bar. Use of the bus bar holder allows the plurality of bus bars to be arranged at fixed positions on the upper surface of the battery stack while insulating the plurality of bus bars from each other and insulating terminal surface 1x of the battery cell and the bus bar. Cover assembly 40 described later may be integrated with the bus bar holder.

The bus bar is manufactured into a predetermined shape by cutting and processing a metal sheet. As the metal sheet configuring the bus bar, metal that is low in electrical resistance and light in weight, such as an aluminum sheet, a copper sheet, or an alloy of these metals can be used. However, as the metal sheet for the bus bar, other types of metal that are low in electrical resistance and light in weight or an alloy of them can be used.

(End Plate 20)

As shown in FIG. 2, end plates 20 are arranged at both ends of battery stack 10 and fastened via the pair of right and left fastening members 15 arranged along the both side surfaces of battery stack 10. End plates 20 are arranged at both ends of battery stack 10 in the stack direction of battery cells 1 and outside end surface spacer 17 to sandwich battery stack 10 from both ends.

(Fastening Member 15)

Fastening member 15 has both ends fixed to end plates 20 arranged on both end surfaces of battery stack 10. End plates 20 are fixed by the plurality of fastening members 15 to fasten battery stack 10 in the stack direction. As shown in FIG. 2 and the like, each fastening member 15 is made of metal having a predetermined width and a predetermined thickness along the side surface of battery stack 10, and is arranged opposite to both side surfaces of battery stack 10. A metal sheet of iron or the like, preferably a steel sheet, can be used as fastening member 15. Fastening member 15 made of a metal sheet is bent by press molding or the like to be formed into a predetermined shape.

Fastening member 15 has an upper and lower parts of plate-shaped fastening main surface 15a bent in a U-shape to form bent pieces 15d. Upper and lower bent pieces 15d cover upper and lower surfaces of battery stack 10 from the corners on the right and left side surfaces of battery stack 10. Fastening member 15 is fixed to an outer peripheral surface of end plate 20 by screwing bolts 15f into a plurality of fastening screw holes opened in fastening main surface 15a. Fastening main surface 15a and end plate 20 are not necessarily fixed by screwing with bolts, and may be fixed with pins, rivets, or the like.

Power source device 100 having a large number of battery cells 1 stacked is configured such that the plurality of battery cells 1 are constrained by coupling, by means of fastening members 15, end plates 20 arranged at the both ends of battery stack 10 including the plurality of battery cells 1. By constraining the plurality of battery cells 1 via end plates 20 and fastening members 15 that have high rigidity, it is possible to suppress malfunction or the like caused by swelling, deformation, relative displacement, or vibration of battery cells 1 due to charging and discharging or degradation.

(Insulating Sheet 30)

Insulating sheet 30 is interposed between fastening member 15 and battery stack 10. Insulating sheet 30 is made of a material having insulating properties, such as a resin or the like, and insulates between fastening member 15 made of metal and the battery cells. Insulating sheet 30 shown in FIG. 2 and the like includes flat plate 31 covering the side surface of battery stack 10, and bent covered part 32 provided on each of an upper part and a lower part of flat plate 31. Bent covered parts 32 are each bent from flat plate 31 in a U-shape and folded so as to cover bent pieces 15d of fastening member 15. Due to this, by being covered with the insulating bent covered part from the upper surface to the side surface and the lower surface, bent piece 15d can avoid unintended conduction between battery cell 1 and fastening member 15.

Bent piece 15d presses the upper surfaces and the lower surfaces of battery cells 1 of battery stack 10 via bent covered part 32. This enables each battery cell 1 to be held in the height direction by being pressed by bent piece 15d in the up-down direction, and each battery cell 1 to be maintained so as not to be displaced in the up-down direction even if vibration, impact, or the like is applied to battery stack 10.

The insulating sheet can be unnecessary in a case where the battery stack and the surface of the battery stack are insulated, for example, in a case where the battery cells are housed in an insulating case or covered with a heat-shrinkable film made of resin, in a case where an insulating paint or coating is applied to the surface of the fastening member, or in a case where the fastening member is made of an insulating material. Insulating sheet 30 may also have bent covered part 32 formed only on the upper end in a case where insulation from bent piece 15d of fastening member 15 near the lower surface of battery stack 10 does not need to be taken into consideration. This applies to, for example, a case where battery cells 1 are covered with a heat-shrinkable film. Insulating sheet 30 may also be configured to serve as the bus bar holder holding the bus bar described above.

(Cover Assembly 40)

Power source device 100 is provided with cover assembly 40 on the upper surface of battery stack 10. Cover assembly 40 configures a gas discharge path for discharging a high-temperature, high-pressure gas to the outside of power source device 100 when this gas is discharged from any of battery cells 1 constituting battery stack 10. Note that cover assembly 40 may also be configured to serve as a bus bar holder that holds the bus bar.

Figure 3:
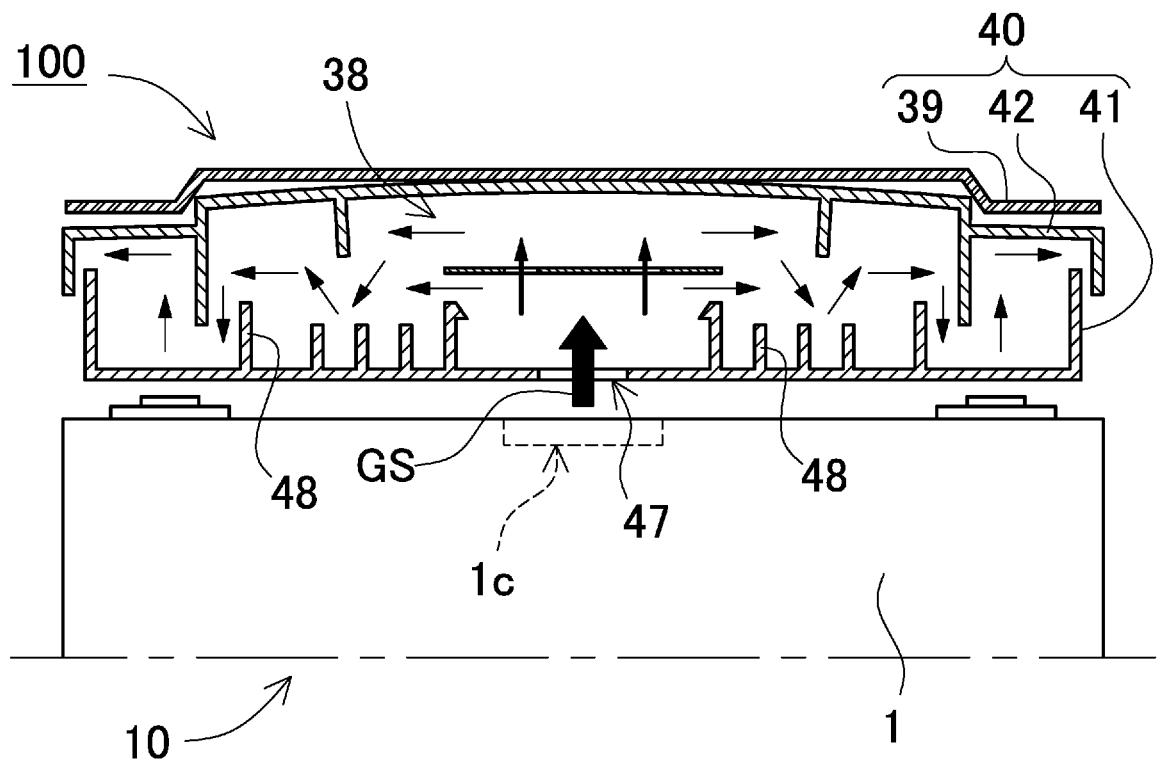
FIG. 3 is an enlarged schematic sectional view showing a gas duct part of the power source device according to the first exemplary embodiment.

As shown in the schematic sectional view of FIG. 3, cover assembly 40 includes first cover 41, second cover 42, and third cover 39. First cover 41 is provided on the upper surface of battery stack 10. First cover 41 has gas introduction port 47 opened at a position corresponding to gas discharge valve 1c of battery cell 1 constituting battery stack 10.

Second cover 42 is provided on the upper surface of first cover 41, and defines gas duct 38 with first cover 41. In gas duct 38, baffle plate 48 is formed between first cover 41 and second cover 42. Due to this, even if high-temperature, high-pressure gas GS is discharged from gas discharge valve 1c, gas GS is prevented from proceeding until gas GS is discharged toward the side surface of battery stack 10, the pressure is lowered, the temperature is lowered, and gas GS is safely discharged to the outside.

Furthermore, third cover 39 is provided on the upper surface of second cover 42, and abuts on the upper surface of second cover 42. Third cover 39 is made of metal. With such a configuration, even if high-temperature, high-pressure gas GS is discharged from gas discharge valve 1c, by reinforcing the upper surface of second cover 42 with metallic third cover 39, it is possible to suppress deformation of second cover 42, and avoid a situation in which an unintended gas discharge path avoiding a baffle plate 48 is formed.

Figure 4:
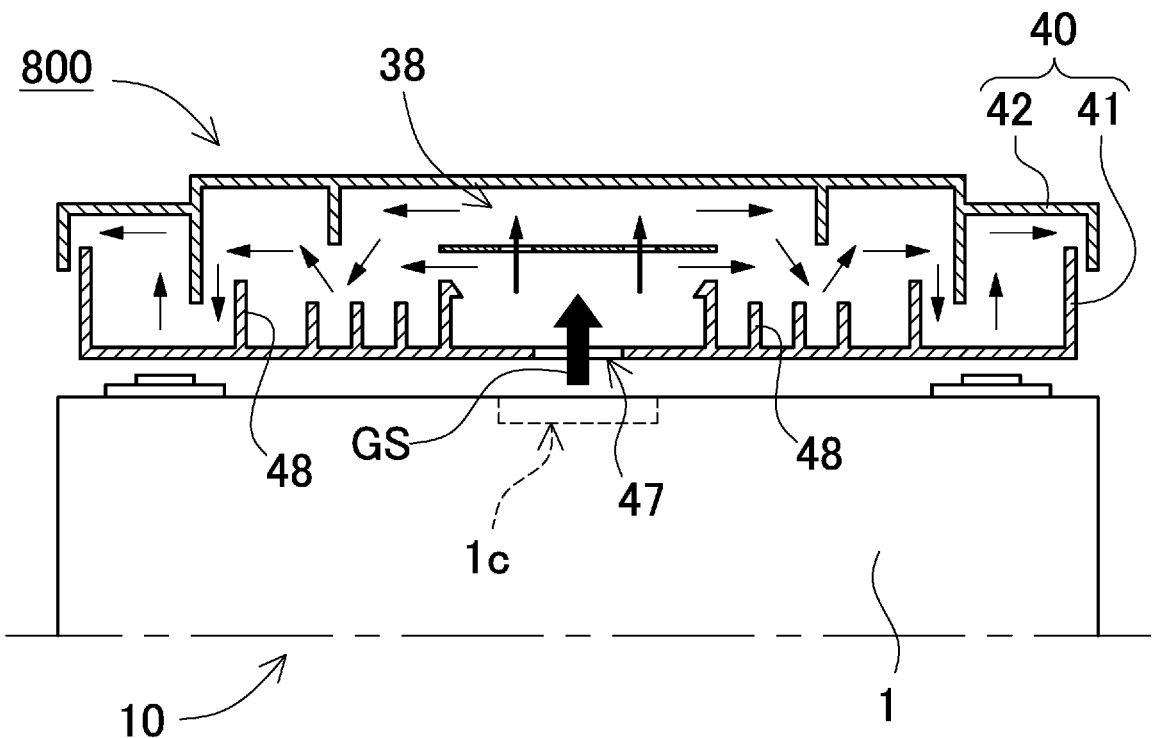
FIG. 4 is a transverse sectional view of a power source device showing a conventional outer edge prevention structure.

As in power source device 800 according to a comparative example shown in the schematic sectional view of FIG. 4, by providing a large number of baffle plates 48 in gas duct 38 and bending the gas discharge path so that so as to discharge gas GS along baffle plates 48, it becomes possible to reduce the momentum and also lower the temperature to safely discharge the gas to the outside.

Figure 5:
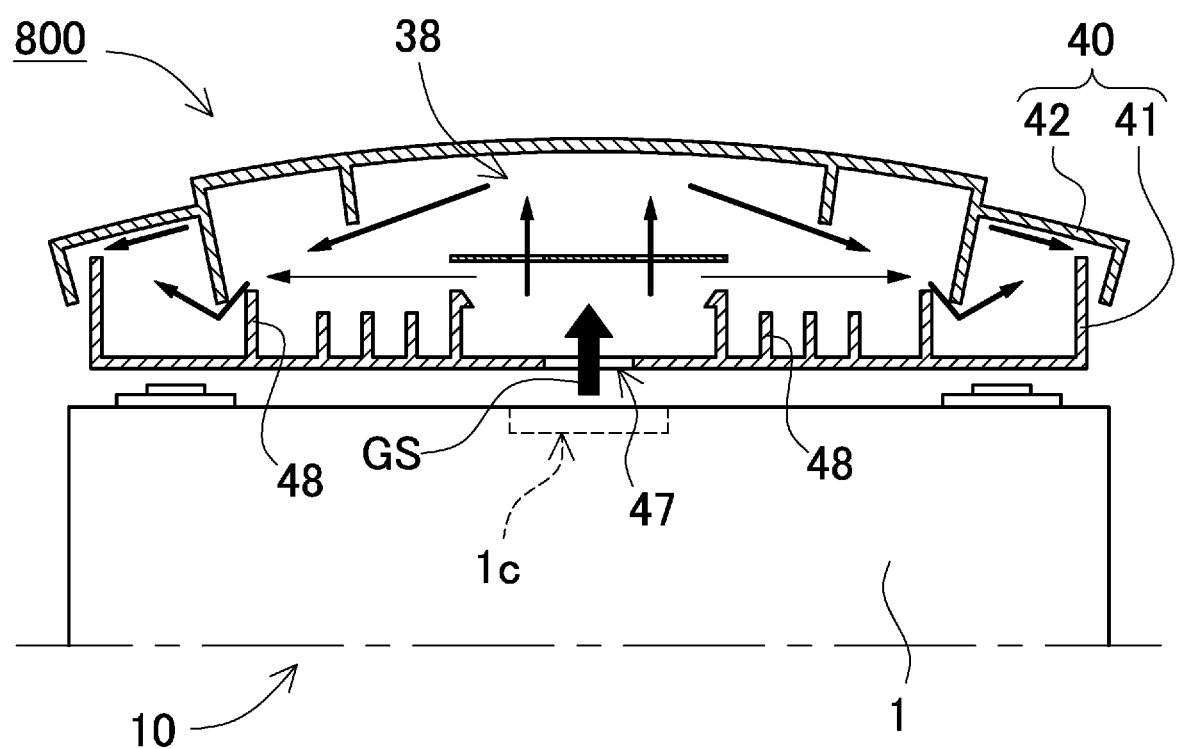
FIG. 5 is a transverse sectional view showing a state in which gas is discharged in the power source device of FIG. 4.

However, when the pressure of gas GS to be discharged is high, as shown in the transverse sectional view of FIG. 5, as a result of gas duct 38 being deformed by the gas pressure, a gas discharge path avoiding baffle plate 48 is formed, and it is conceivable that gas GS is discharged to the outside of the power source device at a high pressure and temperature. In particular, there has been a limit in resistance against deformation in a case where first cover 41 and second cover 42 constituting gas duct 38 are made of resin from the viewpoint of insulation and the like.

On the other hand, in power source device 100 according to the present exemplary embodiment, by covering the upper surface of second cover 42 with metallic third cover 39 as shown in FIG. 3, it is possible to suppress deformation due to gas pressure.

Third cover 39 can also improve rigidity against swelling of the battery cell. Since battery cell 1 expands due to charging and discharging, such deformation is accumulated, and the overall length of battery stack 10 also changes. As shown in FIG. 2, end plate 20 is arranged on the end surface of battery stack 10 so as to oppose such a swelling force of battery stack 10, and end plates 20 are fastened to each other by fastening member 15 on the side surface of battery stack 10.

Figure 6:
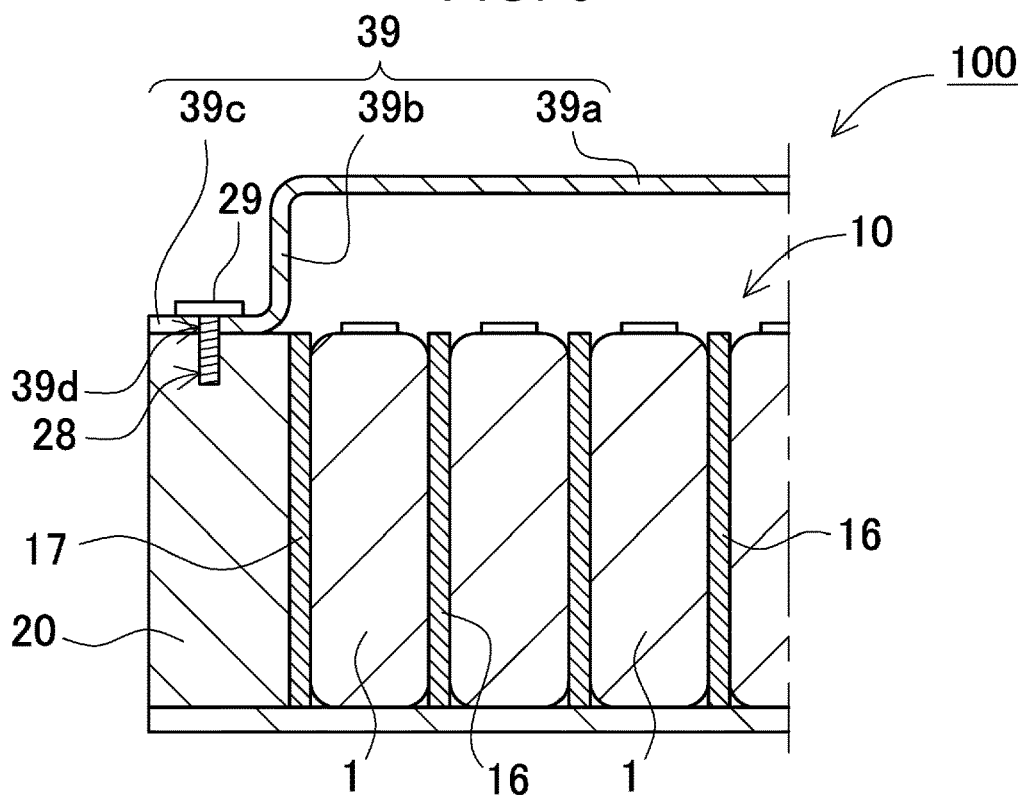
FIG. 6 is a schematic vertical sectional view of the power source device.

Furthermore, as shown in the schematic sectional view of FIG. 6, by fixing third cover 39 to the upper surface of end plate 20, it is possible to improve the rigidity against the swelling force of the battery cell also on the upper surface of battery stack 10. On the other hand, first cover 41 and second cover 42 are made of resin that ensures insulation and facilitates formation of baffle plate 48 inside gas duct 38, and each cover is assigned with a different function and made of a material corresponding to the function assigned to each cover.

Figure 7:
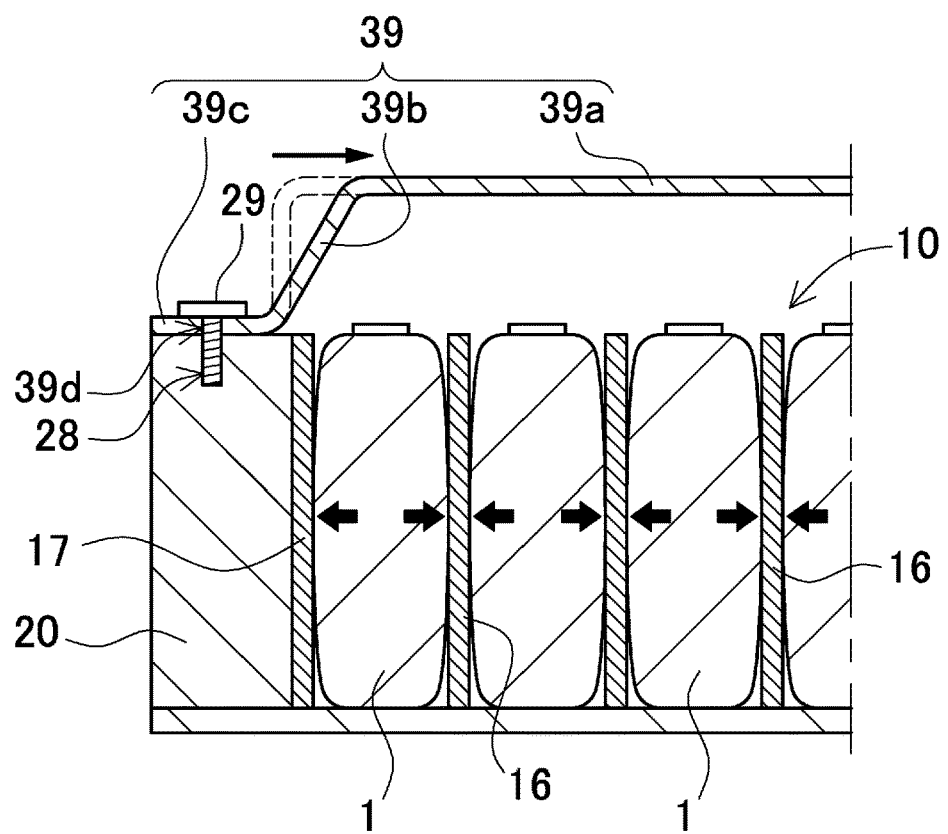
FIG. 7 is a schematic vertical sectional view showing a state in which a battery cell swells in the power source device of FIG. 6.

End plate 20 has a plate shape having a main surface and a side surface intersecting the main surface. Plate screw hole 28 is formed on the side surface. Third cover 39 is fixed to the upper surface of end plate 20 with bolt 29. Bolt 29 is inserted into and fastened to fastening screw hole 39d of third cover 39 and plate screw hole 28 of end plate 20. Third cover 39 includes a structure that relaxes a load near a fastening part of bolt 29. Specifically, as shown in the schematic sectional view of FIG. 6, third cover 39 includes fastening body 39a in a plate shape, intermediate part 39b in which both ends of fastening body 39a are bent, and coupling piece 39c that is provided with a height difference from fastening body 39a by bending an end of intermediate part 39b far from fastening body 39a. Fastening body 39a and coupling piece 39c are formed in a stepped shape via intermediate part 39b. Coupling piece 39c forms fastening screw hole 39d. With such configuration, even if battery stack 10 swells, deformation is absorbed by two bent parts with intermediate part 39b interposed therebetween as shown in FIG. 7. As a result, movement of coupling piece 39c is suppressed, and occurrence of bolt slippage in fastening screw hole 39d of coupling piece 39c can be suppressed.

Figure 8:
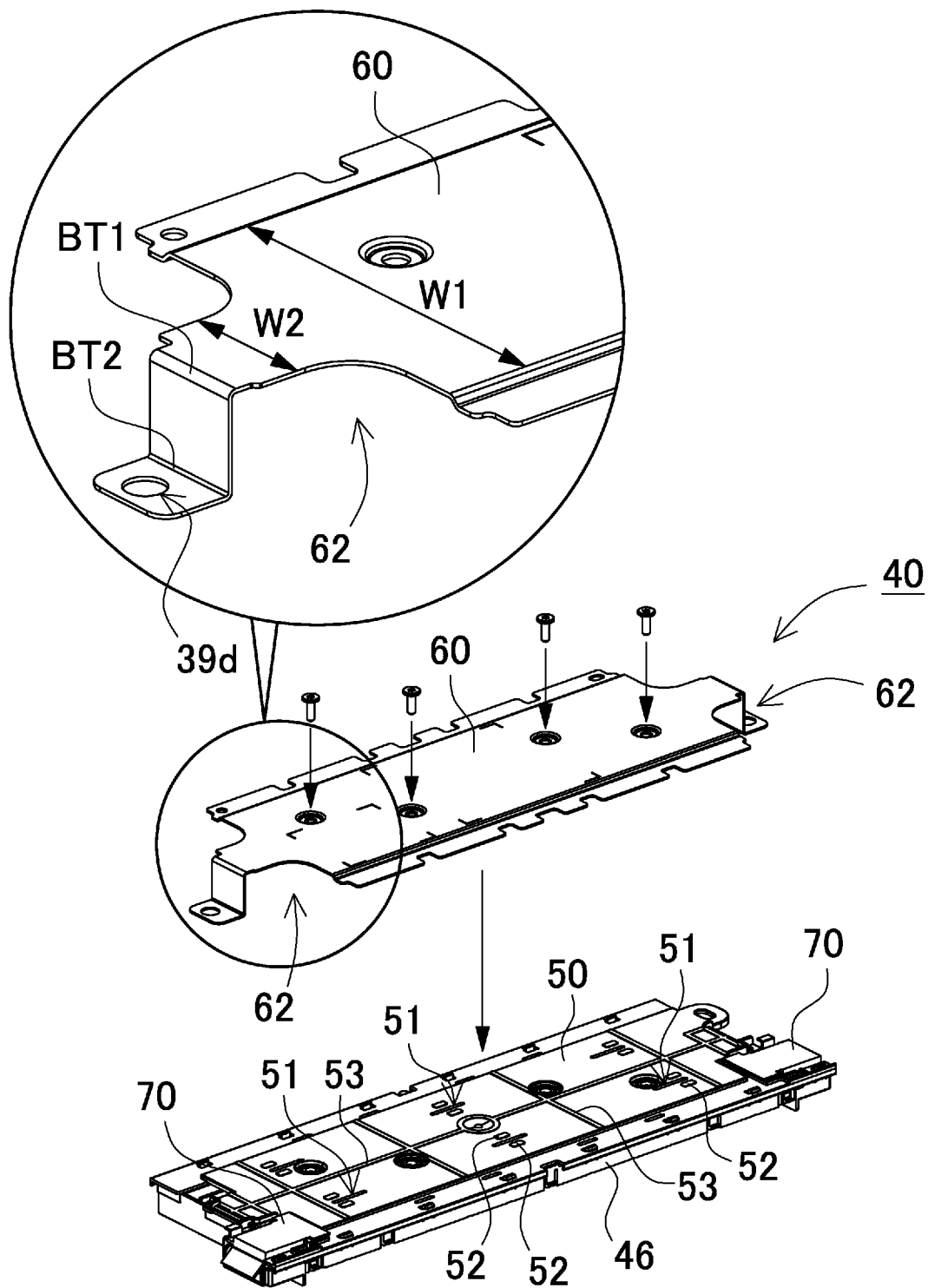
FIG. 8 is an exploded perspective view with an enlarged view of a main part showing a state in which a reinforcement cover is removed from a cover assembly of FIG. 2.
Figure 9:
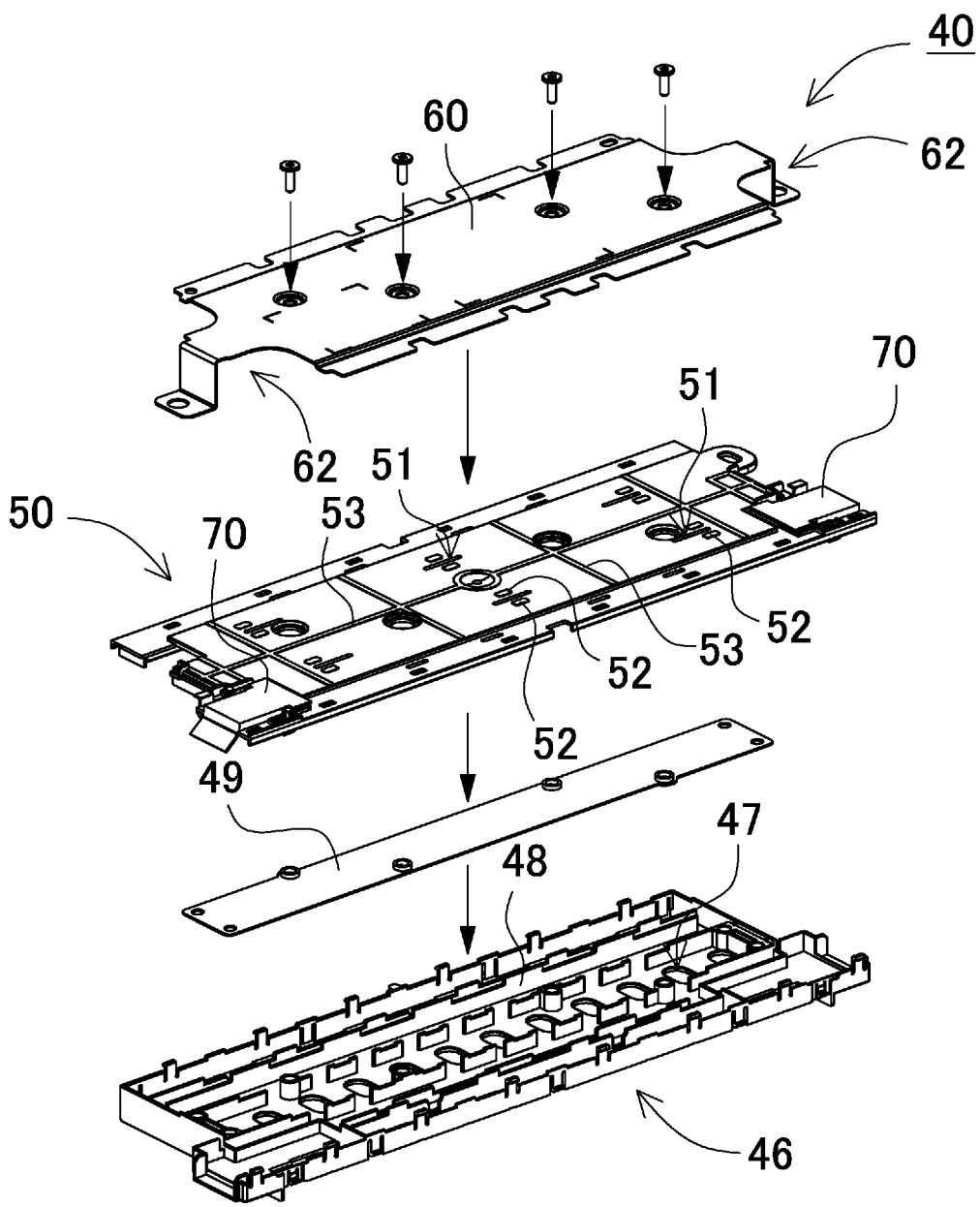
FIG. 9 is an exploded perspective view of FIG. 8.
Figure 10:
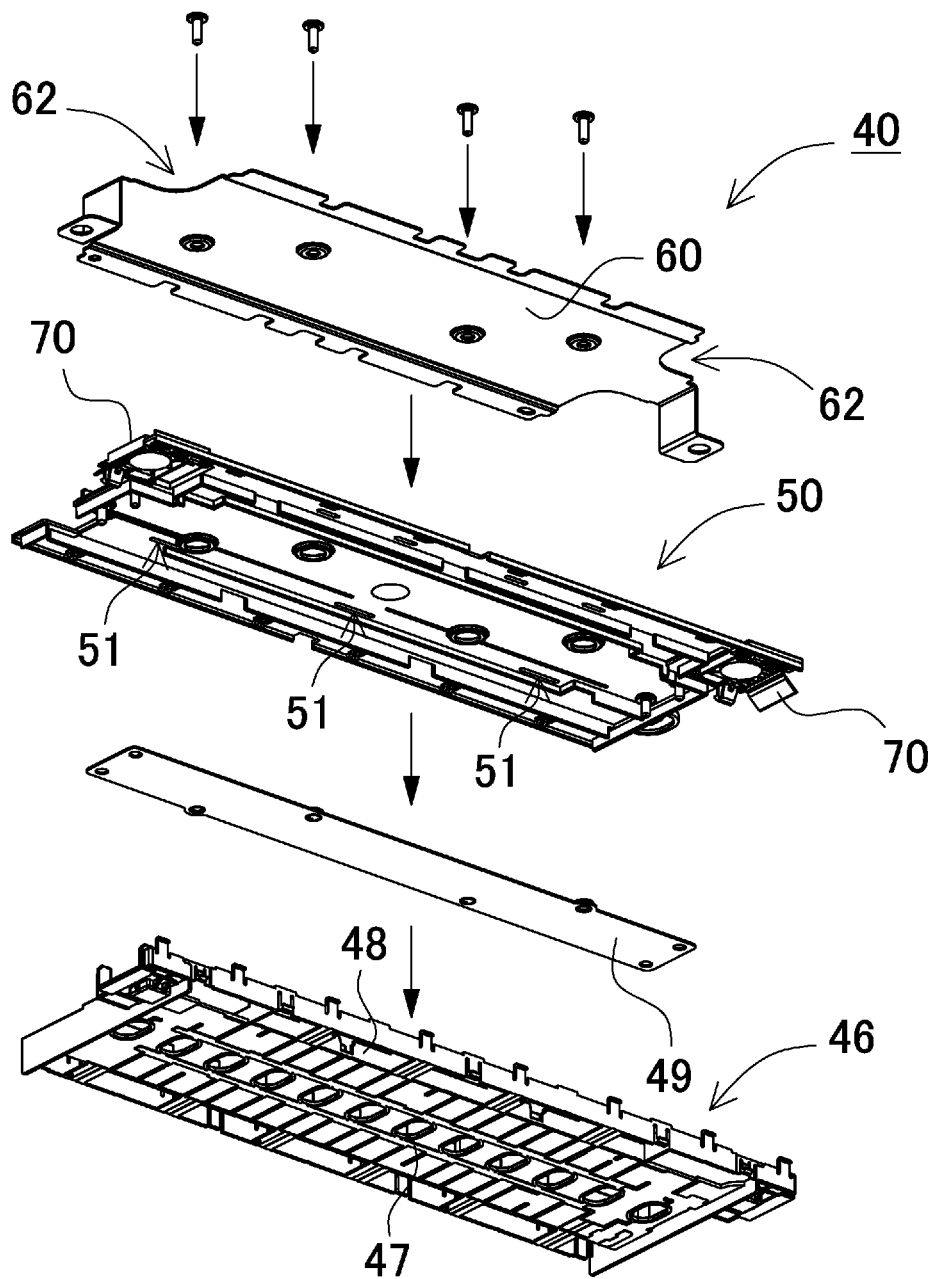
FIG. 10 is an exploded perspective view of FIG. 9 as viewed obliquely from below.
Figure 11:
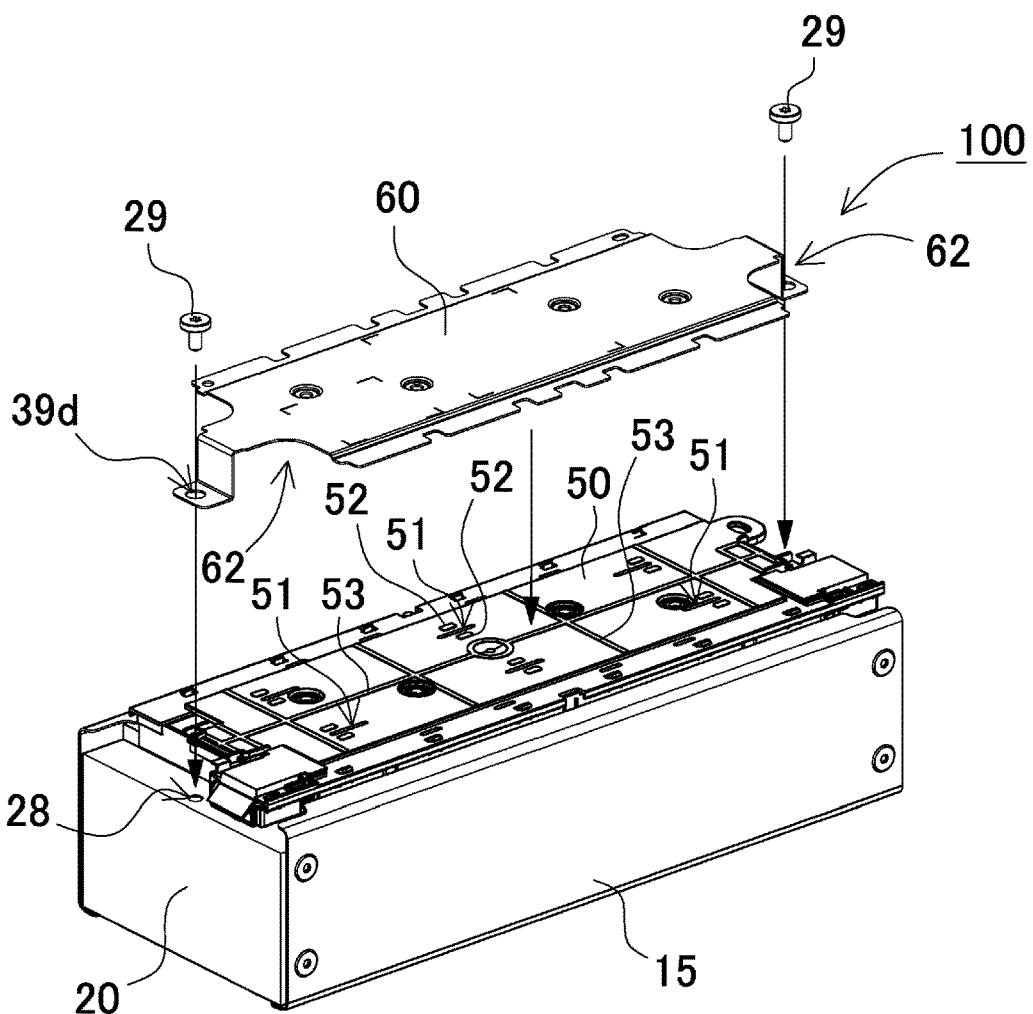
FIG. 11 is an exploded perspective view showing a state in which a reinforcement cover is removed from the power source device of FIG. 1.
Figure 12:
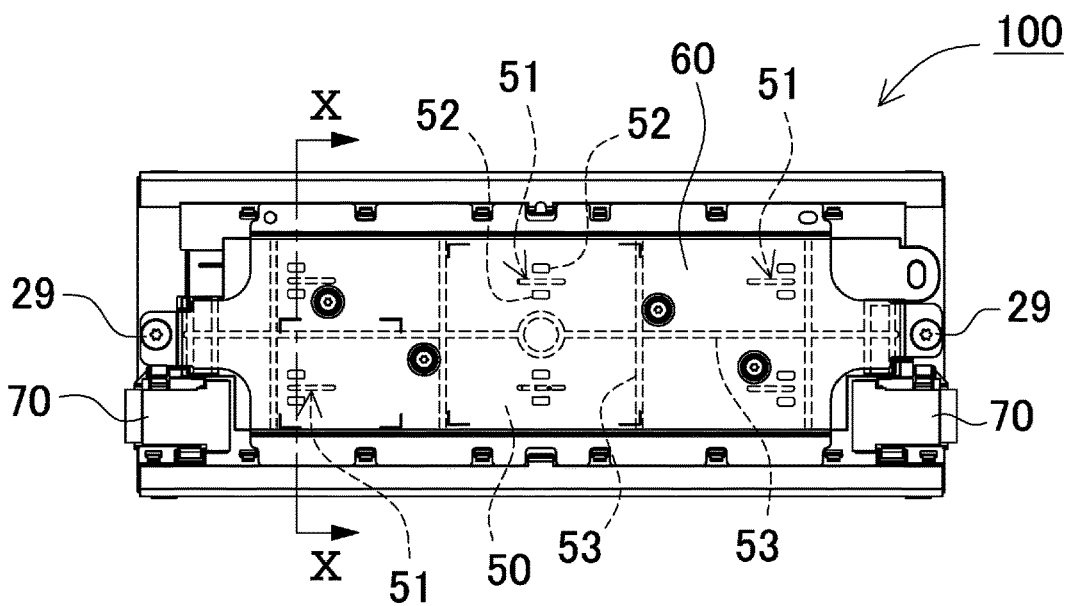
FIG. 12 is a plan view of the power source device of FIG. 1 with the reinforcement cover in a transparent state.
Figure 13:
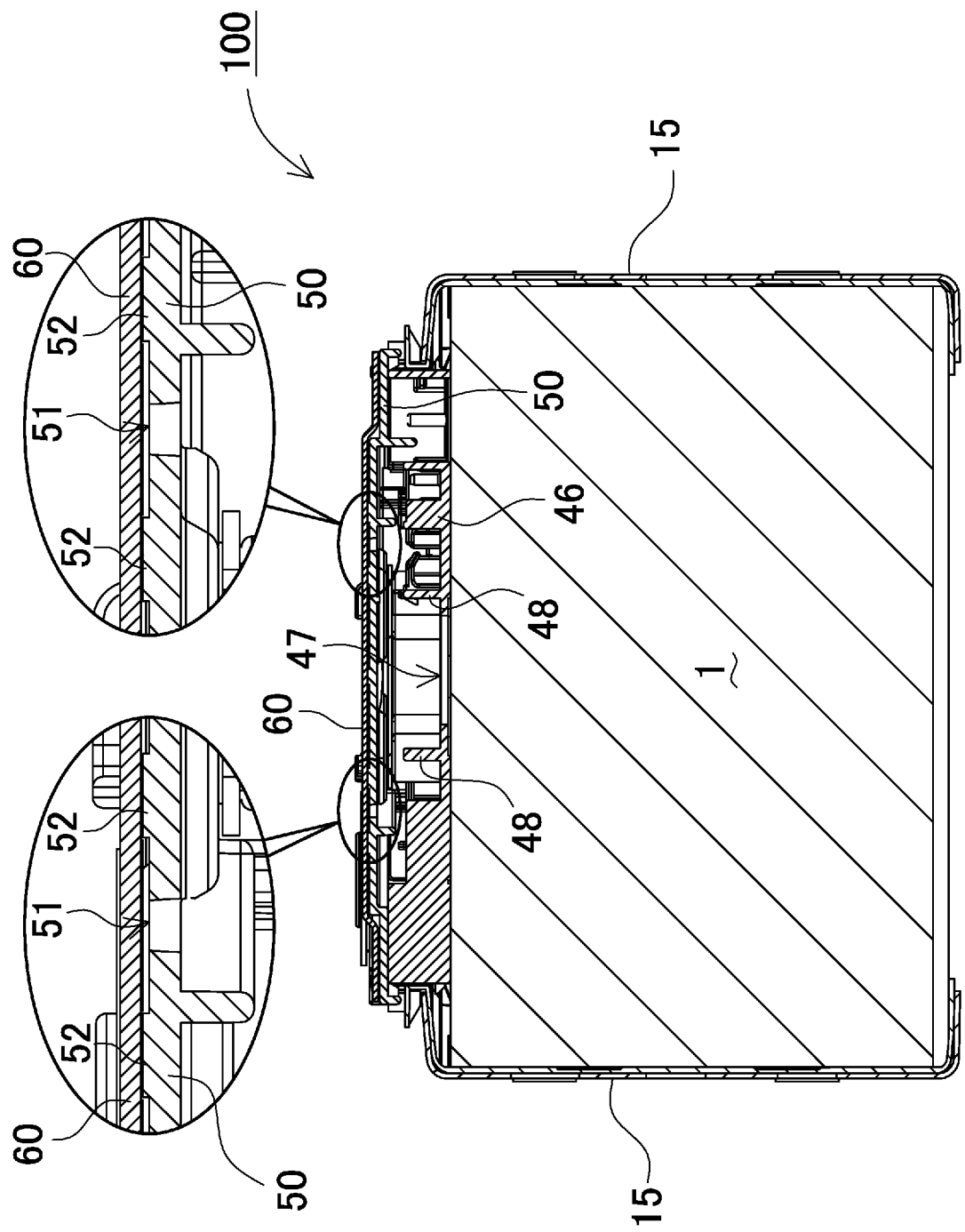
FIG. 13 is a sectional view with an enlarged view of a main part taken along line X-X in FIG. 12.

Hereinafter, a specific configuration of cover assembly 40 will be described with reference to FIGS. 8 to 13. In these figures, FIG. 8 is an exploded perspective view with an enlarged view of a main part showing a state in which reinforcement cover 60 is removed from cover assembly 40 of FIG. 2, FIG. 9 is an exploded perspective view of FIG. 8, FIG. 10 is an exploded perspective view of FIG. 9 as viewed obliquely from below, FIG. 11 is an exploded perspective view showing a state in which reinforcement cover 60 is removed from power source device 100 of FIG. 1, FIG. 12 is a plan view of power source device 100 of FIG. 1 with reinforcement cover 60 in a transparent state, and FIG. 13 is a sectional view with an enlarged view of a main part taken along line XIII-XIII in FIG. 12. Cover assembly 40 shown in these figures includes lower cover 46, upper cover 50, and reinforcement cover 60. The lower cover corresponds to first cover 41 described above, upper cover 50 corresponds to second cover 42, and reinforcement cover 60 corresponds to third cover 39.

(Lower Cover 46)

Lower cover 46 is provided on the upper surface of battery stack 10, and defines first gas duct 43 communicating with gas discharge valve 1c. As shown in FIGS. 9 and 10, lower cover 46 has gas introduction port 47 opened at a position corresponding to gas discharge valve 1c of battery cell 1. As shown in FIGS. 9, 10, 13, and the like, lower cover 46 has a large number of baffle plates 48, and by baffle plates 48 changing the travelling direction until the high-temperature, high-pressure gas is discharged, the momentum is reduced and the temperature is lowered. The gas discharge path is provided not only in the stack direction of battery cells 1 but also in a direction intersecting the stack direction. Lower cover 46 is made of resin having excellent insulation properties, for example, polycarbonate.

(Intermediate Plate 49)

The upper surface of lower cover 46 is provided with intermediate plate 49. Intermediate plate 49 is provided at the center in the width of battery stack 10, and is disposed so as to oppose gas discharge valve 1c. Intermediate plate 49 is made of a material excellent in strength, for example, metal. Due to this, even if a high-temperature, high-pressure gas is discharged from the gas discharge path, the gas is received by metallic intermediate plate 49 higher in strength than the resin cover, so that a situation in which the gas is directly ejected through power source device 100 is avoided.

(Upper Cover 50)

Upper cover 50 is provided on the upper surface of lower cover 46, and defines second gas duct 44 on the upper surface of first gas duct 43. Upper cover 50 is made of resin. A plurality of communication holes 51 through which first gas duct 43 and second gas duct 44 communicate with each other are formed on the upper surface of upper cover 50. Thus, by giving gas duct 38 a two-layer structure of first gas duct 43 and second gas duct 44, even if gas is discharged from the battery cell, the gas is branched into first gas duct 43 and second gas duct 44, and is discharged in a dispersed manner, so that it is possible to suppress a situation in which the gas discharged to the outside is ignited while avoiding the gas from staying inside the power source device. By providing a plurality of exhaust ports for gas discharge, it is possible to reduce the sectional area per one, and it is possible to reduce the risk of ignition even in a case where a high-temperature gas is discharged.

(Communication Hole 51)

It is preferable that communication holes 51 are not opened corresponding to all the battery cells, but are discretely opened so as to serve the plurality of battery cells. In the example of FIG. 9 and the like, communication holes 51 are opened at three places in the stack direction with respect to battery stack 10 in which 12 battery cells 1 are stacked.

It is preferable that communication holes 51 are provided not at positions opposed to gas discharge valve 1c but at positions offset from gas discharge valve 1c. By not directly opening communication holes 51 with respect to gas discharge valve 1c, it is possible to easily disperse the gas. Gas discharge valve 1c is provided at the center of sealing plate 1b of battery cell 1 in the example shown in FIG. 2. On the other hand, as shown in FIG. 9 and the like, communication holes 51 are opened at positions corresponding to the right and left of sealing plate 1b of battery cell 1.

Communication hole 51 is preferably formed in a slit shape. The path area of second gas duct 44 can be set by adjusting the width and length of the slit, the height of second gas duct 44, and the like, and the amount of gas to be discharged can be controlled. In the example of FIG. 13 and the like, the height of second gas duct 44 is defined by the height of communication rib 52 described later.

(Communication Rib 52)

Figure 14:
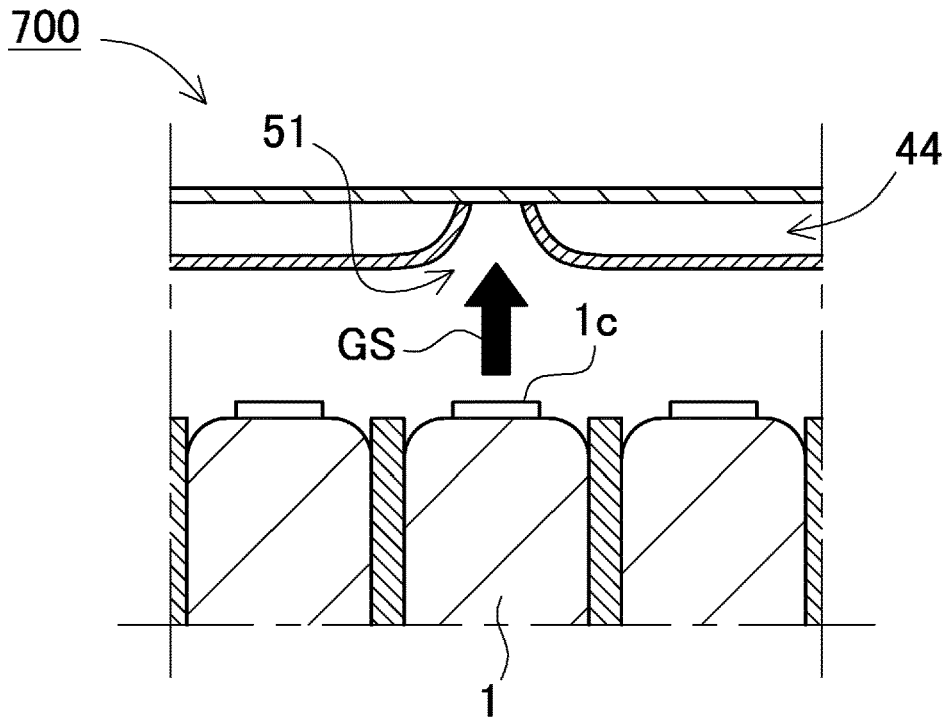
FIG. 14 is an enlarged schematic sectional view showing a gas duct part of the power source device not provided with a communication rib.
Figure 15:
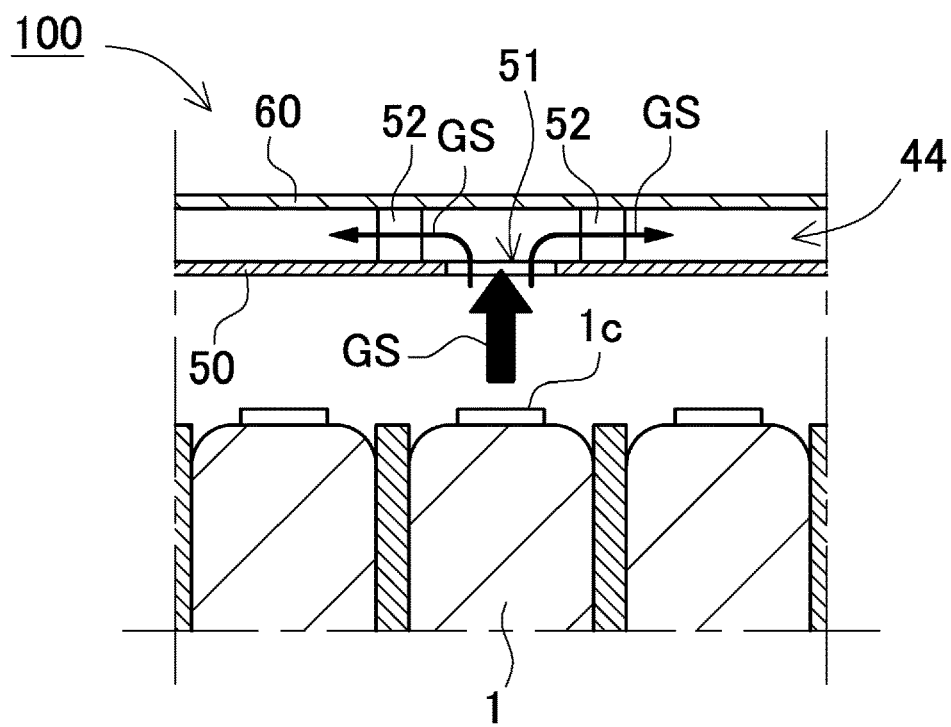
FIG. 15 is an enlarged schematic sectional view showing a gas duct part of the power source device provided with a communication rib.

Upper cover 50 is provided with communication rib 52 protruding toward reinforcement cover 60 around communication hole 51. This makes it possible to block a situation in which the path for introducing gas into second gas duct 44 is obstructed. In a configuration provided with no communication rib, as in power source device 700 shown in the schematic sectional view of FIG. 14, it is conceivable that when high pressure gas is discharged from gas discharge valve 1c, the periphery of communication hole 51 opened on upper cover 50 is deformed by the pressure of the gas, and the gas discharge path is closed. In this state, the gas is not guided to second gas duct 44, and the gas cannot be dispersed and discharged through second gas duct 44. On the other hand, as shown in the schematic sectional view of FIG. 15, by providing communication rib 52 around communication hole 51, it becomes possible to block deformation around communication hole 51, secure an opening end to second gas duct 44, and guide the high-pressure gas to second gas duct 44.

Communication rib 52 is provided on not the entirety but a part of circumference of communication hole 51 so as not to block inflow of the gas into second gas duct 44. It is preferable that as shown in the plan view of FIG. 12, a pair of communication ribs 52 are provided so as to oppose both sides of communication hole 51. In a case of communication hole 51 in a slit shape, it is preferable to arrange the pair of communication ribs 52 so as to intersect with the long direction of the slit. In this example, communication rib 52 is integrally molded with resin upper cover 50. This configuration makes it possible to position and easily form communication rib 52 around communication hole 51. However, it is needless to say that the communication rib may be provided near the reinforcement cover side. In particular, by protruding the communication rib on the metallic reinforcement cover by punching or the like, it is possible to form a communication rib that is stronger and hardly deformed.

(Rib for Partition 53)

Furthermore, upper cover 50 is provided with rib for partition 53 that partitions between the plurality of communication holes 51 adjacent to each other. This makes it possible to partition second gas duct 44 for each communication hole 51, and to cause the high-pressure gas introduced into second gas duct 44 from communication hole 51 not to be discharged in a concentrated manner at one place.

In the example of FIG. 9 and the like, battery stack 10 in which 12 battery cells 1 are stacked is partitioned into three for every four cells, and further divided into two sections on the right and left of battery cell 1, so that battery stack 10 is divided into a total of six partitions. In the example of FIG. 9, the partition rib protrudes on the upper surface of upper cover 50, but the present invention is not limited to this configuration, and it goes without saying that the partition rib may protrude from the reinforcement cover, for example.

Furthermore, the gas discharge path is preferably provided not only in the stack direction of battery cells 1 but also in a direction intersecting the stack direction. By discharging the gas also in the intersecting direction in this manner, it is possible to efficiently discharge the gas to the outside of the power source device and enhance safety. In the example of FIG. 12, a gas discharge path is formed in each of first gas duct 43 and second gas duct 44 so that gas is discharged also in the up-down direction in the figure.

(Reinforcement Cover 60)

Reinforcement cover 60 is provided on the upper surface of upper cover 50. Second gas duct 44 is formed between reinforcement cover 60 and upper cover 50. Reinforcement cover 60 abuts on the upper surface of upper cover 50 via communication rib 52. With such a configuration, even if a high-temperature, high-pressure gas is discharged from gas discharge valve 1c, deformation of upper cover 50 can be suppressed by reinforcing the upper surface of upper cover 50 with metal reinforcement. In particular, when upper cover 50 is deformed, there is a possibility that an unintended gas discharge path avoiding baffle plate 48 is formed, but such a situation can be avoided by blocking upper cover 50 from deforming with reinforcement cover 60.

Figure 16:
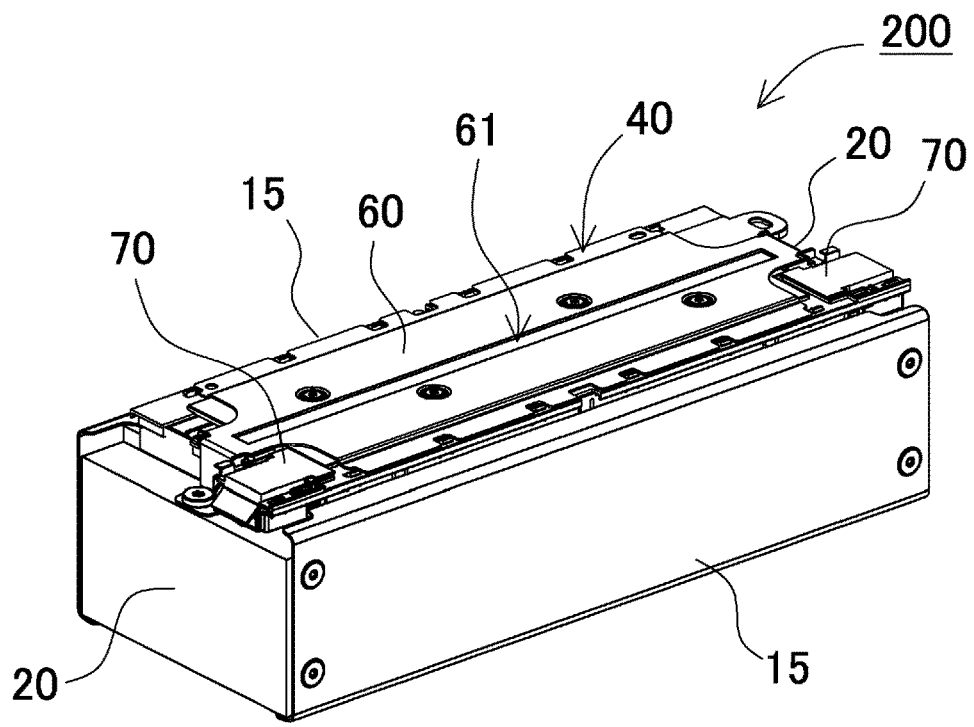
FIG. 16 is a perspective view showing a power source device according to a second exemplary embodiment of the present invention.

Reinforcement cover 60 may form bead 61 in order to increase rigidity. In power source device 200 according to the second exemplary embodiment shown in the perspective view of FIG. 16, bead 61 is formed at the center in the long direction of reinforcement cover 60. The strength can be improved by simple processing of forming bead 61 on metal sheet reinforcement cover 60 in this manner.

(Total Terminal Strip 70)

As described above, electrode terminals 2 of each battery cell 1 constituting battery stack 10 are connected to each other by the bus bar. The power source device includes total terminal strip 70 that draws a total output of the plurality of battery cells 1 connected in series and in parallel via the bus bar. Total terminal strip 70 is made of a metal sheet excellent in conductivity. In order to insulate metallic reinforcement cover 60 and total terminal strip 70 from each other, total terminal strip 70 is exposed from reinforcement cover 60 as shown in FIGS. 9 and 10. Therefore, reinforcement cover 60 forms exposure part 62 that exposes total terminal strip 70. This makes it possible to secure the insulating distance by separating, while using, metallic reinforcement cover 60 from total terminal strips 70 also made of metal, and possible to avoid the possibility of occurrence of an unintended short circuit.

Exposure part 62 can be an exposed cutout in which corner parts of reinforcement cover 60 are cut out so as to expose total terminal strip 70 as shown in FIG. 9 and the like. This enhances the safety by separating metallic reinforcement cover 60 and total terminal strip 70 in the horizontal plane so as not to overlap each other. Alternatively, exposure part 62 may be an exposure window that exposes the total terminal strip.

In the example of FIG. 11 and the like, total terminal strip 70 is provided near one side surface (lower side in the figure) of the upper surface of end plate 20. Exposure part 62 may be formed only at the lower corner of the end of reinforcement cover 60 accordingly, or may be provided on both sides of the end as shown in FIG. 11 and the like. This makes it possible to attach reinforcement cover 60 even if the reinforcement cover is turned in the right-left direction, and the assembling workability is improved.

Figure 22:
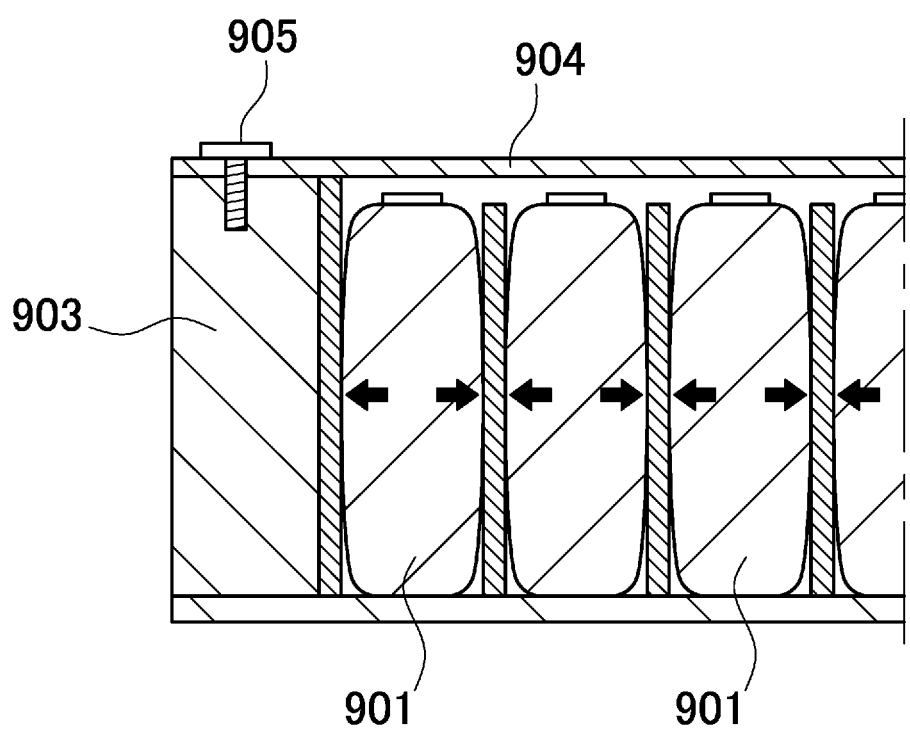
FIG. 22 is a schematic horizontal sectional view showing a state in which bolt slippage occurs due to swelling and contraction of a battery stack.

Reinforcement cover 60 is fixed to the upper surface of end plate 20 with bolt 29 or the like as shown in FIG. 10. Reinforcement cover 60 includes a structure that relaxes a load near a fastening part of bolt 29. Specifically, as shown in FIGS. 1, 8, and the like, reinforcement cover 60 is bent at two places of first bent part BT1 and second bent part BT2 by protruding an intermediate part of fastening body 39a formed with exposure part 62, and thus forms intermediate part 39b and coupling piece 39c. First bent part BT1 and second bent part BT2 are bent so as to be parallel to each other. The bending direction is set such that fastening body 39a and coupling piece 39c are parallel with different heights. By adding the plurality of bends in this manner, as shown in the schematic sectional views of FIGS. 6 and 7, even when the battery cell swells, intermediate part 39b is bent at first bent part BT1 and second bent part BT2 to be in an inclined posture, and a change in which the total length of battery stack 10 becomes long can be absorbed. Due to this, as compared with the linear fastening member as shown in FIG. 22, it is possible to suppress a situation in which bolt slippage occurs in coupling piece 39c, reduce loosening of bolt 29, and improve reliability of the fixed state of reinforcement cover 60.

Figure 17:
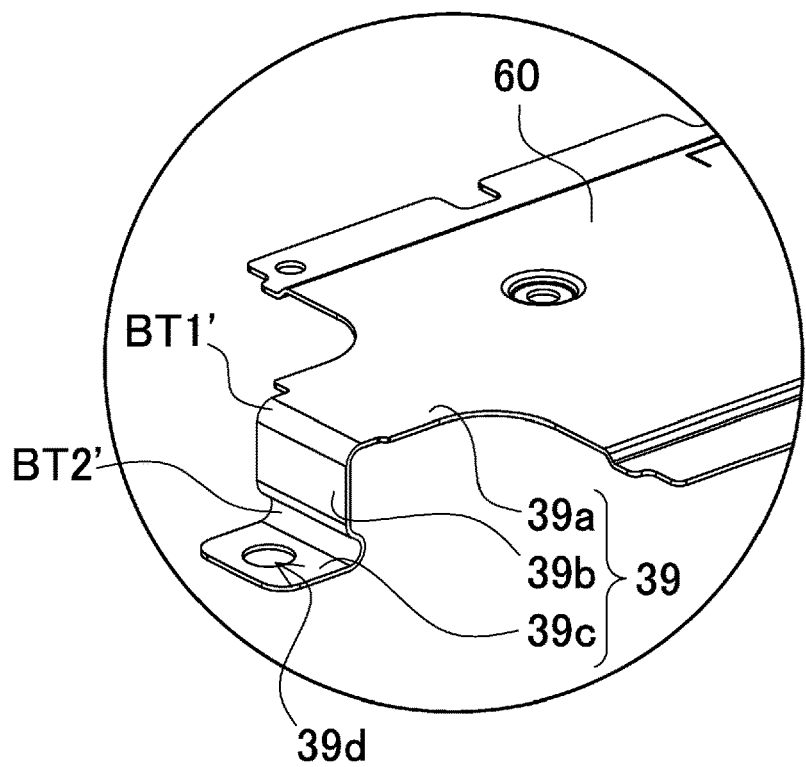
FIG. 17 is a perspective view showing an end of a reinforcement cover of a power source device according to a modified example.

In each bent part, by gently bending intermediate part 39b and coupling piece 39c so that first bent part BT1' and second bent part BT2' become not in an L shape but a curved surface as shown in FIG. 17, it is possible to further enhance the load distribution effect, and to control the load generated by the swelling force of the battery stack and the like.

In addition, in reinforcement cover 60, coupling piece 39c is formed to be narrower in width than the fastening main surface, so that a section modulus is reduced, and an influence of swelling and contraction of battery stack 10 is reduced. Specifically, width W1 of reinforcement cover 60 is reduced to W2 in coupling piece 39c by forming both side corners of the reinforcement cover end so as to be gouged by the exposure part. By reducing the lateral width of the metal sheet in this manner, the section modulus can be reduced, and the resistance force against the bending moment can be improved.

Power source device 100 described above can be used as a power source for a vehicle that supplies electric power to a motor that causes an electric vehicle to travel. As an electric vehicle equipped with power source device 100, electric vehicles such as a hybrid vehicle and a plug-in hybrid vehicle that travel with both an engine and a motor, or an electric car that travels only with a motor can be used, and the power source device is used as a power source for these vehicles. An example will be described in which a large-capacity, high-output power source device where a large number of power source devices 100 described above are connected in series or in parallel in order to obtain electric power for driving an electric vehicle and a necessary controlling circuit is further added is constructed.

(Power Source Device for Hybrid Vehicle)

Figure 18:
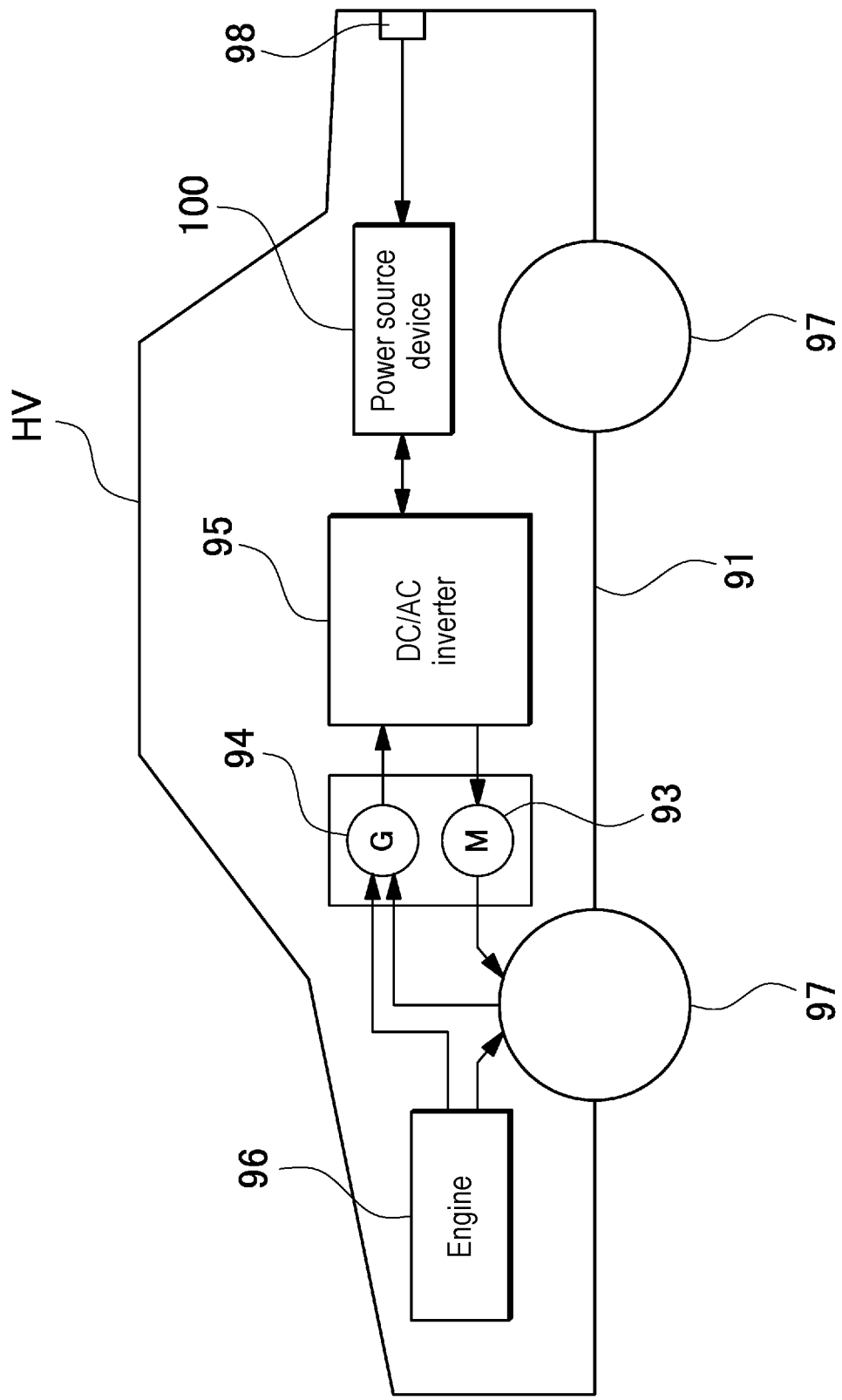
FIG. 18 is a block diagram showing an example of equipping a power source device on a hybrid vehicle that is driven by an engine and a motor.

FIG. 18 shows an example in which power source device 100 is equipped on a hybrid vehicle that travels with both an engine and a motor. Vehicle HV equipped with power source device 100 shown in this figure includes vehicle body 91, engine 96 and motor for travelling 93 that cause vehicle body 91 to travel, wheels 97 driven by engine 96 and motor for travelling 93, power source device 100 that supplies electric power to motor 93, and generator 94 that charges the battery of power source device 100. Power source device 100 is connected to motor 93 and generator 94 via DC/AC inverter 95. Vehicle HV travels with both motor 93 and engine 96 while charging and discharging the battery of power source device 100. Motor 93 is driven in a region where engine efficiency is low, for example, during acceleration or low-speed travelling, and causes the vehicle to travel. Motor 93 is driven by electric power supplied from power source device 100. Generator 94 is driven by engine 96 or regenerative braking when the vehicle is braked, to charge the battery of power source device 100. As shown in FIG. 18, vehicle HV may include charging plug 98 for charging power source device 100. By connecting charging plug 98 to an external power source, it is possible to charge power source device 100.

(Power Source Device for Electric Car)

Figure 19:
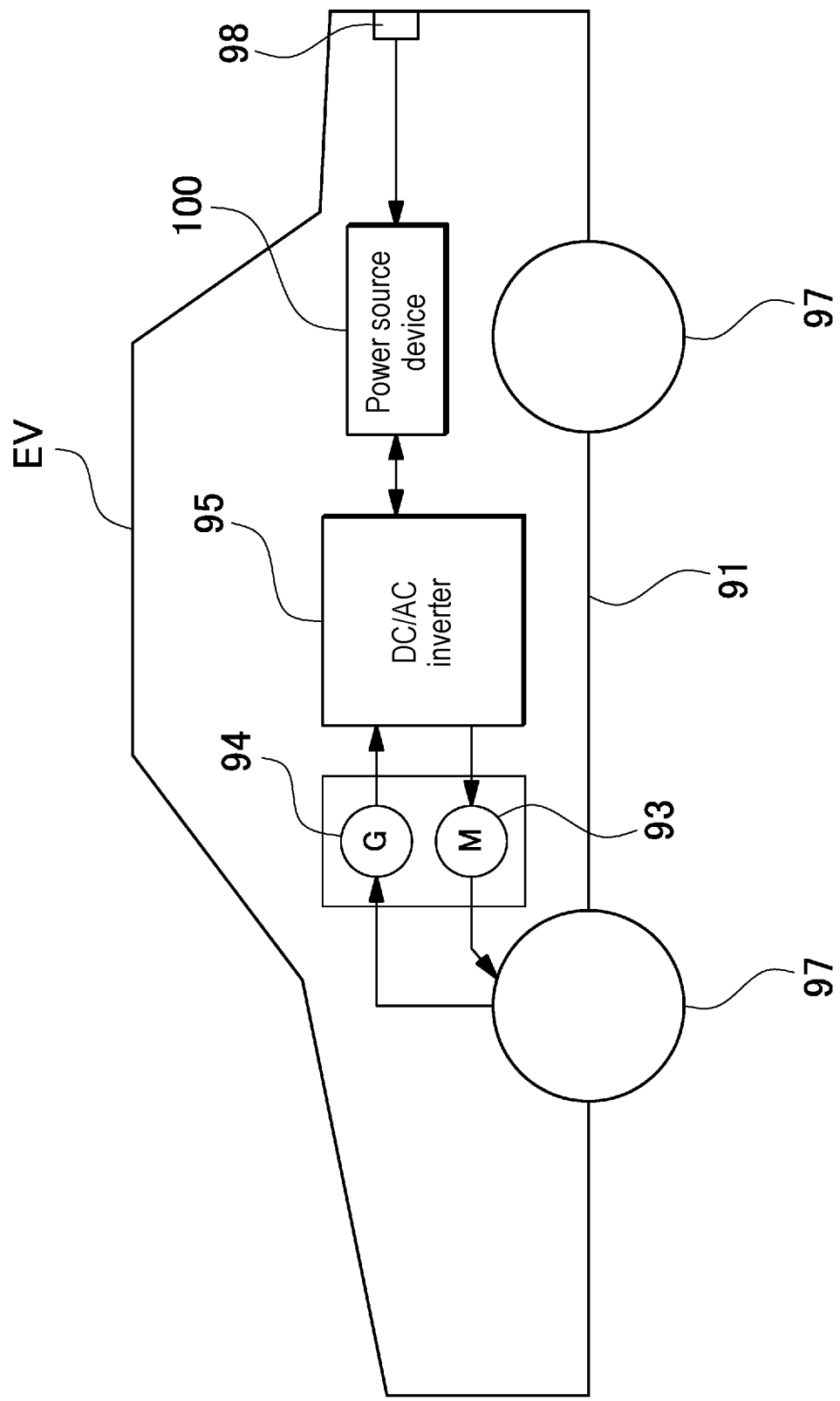
FIG. 19 is a block diagram showing an example of equipping a power source device on an electric car that is driven only by a motor.

FIG. 19 shows an example in which power source device 100 is equipped on an electric car that travels only with a motor. Vehicle EV equipped with power source device 100 shown in this figure includes vehicle body 91, motor for travelling 93 that causes vehicle body 91 to travel, wheels 97 that are driven by motor 93, power source device 100 that supplies electric power to motor 93, and generator 94 that charges the battery of power source device 100. Power source device 100 is connected to motor 93 and generator 94 via DC/AC inverter 95. Motor 93 is driven by electric power supplied from power source device 100. Generator 94 is driven by the energy at the time of applying regenerative braking to vehicle EV, and charges the battery of power source device 100. Vehicle EV includes charging plug 98, and power source device 100 can be charged by connecting charging plug 98 to an external power source.

(Power Source Device for Electrical Storage Device)

Figure 20:
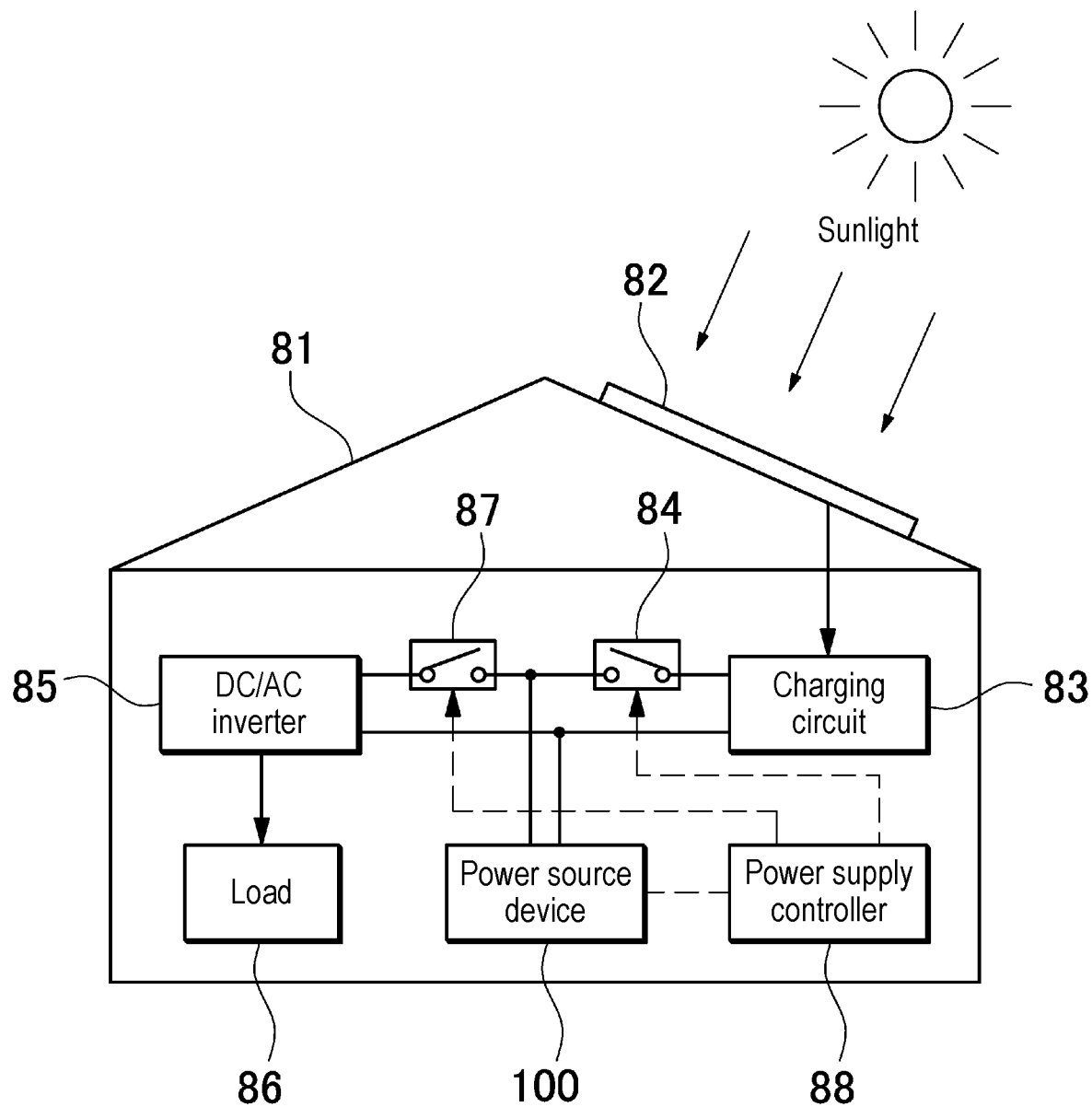
FIG. 20 is a block diagram showing an example of application to a power source device for power storage.
Figure 21:
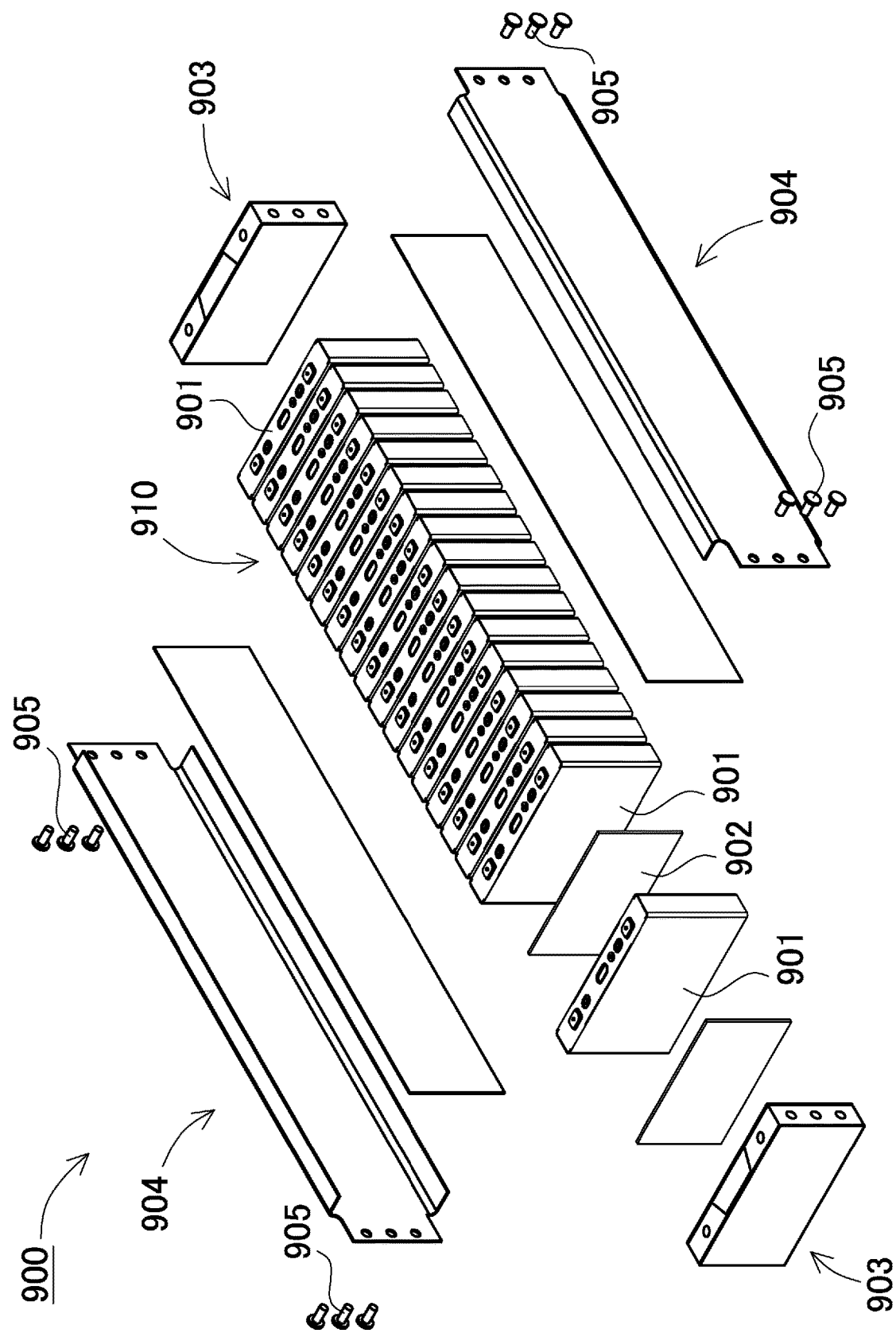
FIG. 21 is an exploded perspective view showing a scene of fastening a battery stack with a bind bar.

Furthermore, the present invention does not limit the application of the power source device to a power source for a motor that causes a vehicle to travel. The power source device according to the exemplary embodiment can be used as a power supply for a power storage device that stores electricity by charging a battery with electric power generated by photovoltaic power generation, wind power generation, or other methods. FIG. 20 shows an electrical storage device that stores electricity by charging the battery of power source device 100 with solar battery 82.

The electrical storage device shown in FIG. 20 charges the batteries of power source device 100 with electric power generated by solar battery 82 that is disposed on a roof or a rooftop of building 81 such as a house or a factory. The power storage device charges the batteries of power source device 100 through charging circuit 83 with solar battery 82 serving as a charging power supply, and then supplies electric power to load 86 via DC/AC inverter 85. Thus, this electrical storage device includes a charge mode and a discharge mode. In the electrical storage device shown in the figure, DC/AC inverter 85 and charging circuit 83 are connected to power source device 100 via discharging switch 87 and charging switch 84, respectively. On/off of discharging switch 87 and charging switch 84 is switched by power supply controller 88 of the electrical storage device. In the charge mode, power supply controller 88 turns on charging switch 84 and turns off discharging switch 87 to allow charging from charging circuit 83 to power source device 100. When charging is completed and the battery is fully charged or in a state where a capacity of a predetermined value or more is charged, power supply controller 88 turns off charging switch 84 and turns on discharging switch 87 to switch the mode to the discharge mode and allows discharging from power source device 100 to load 86. Where necessary, supply of electric power to load 86 and charging of power source device 100 can be simultaneously carried out by turning on charging switch 84 and turning on discharging switch 87.

Although not illustrated, the power source device can also be used as a power source for an electrical storage device that stores electricity by charging a battery using midnight electric power at night. The power source device that is charged with midnight electric power is charged with the midnight electric power that is surplus electric power generated by a power station, and outputs the electric power during the daytime when an electric power load increases, which can limit peak electric power during the daytime to a small value. The power source device can also be used as a power source charged with both output of a solar battery and the midnight electric power. Effectively using both electric power generated by the solar battery and the midnight electric power, this power source device can efficiently perform power storage in consideration of weather and electric power consumption.

The power storage system as described above can be suitably used in applications including a backup power source device that can be equipped on a computer server rack, a backup power source device for wireless base stations for cellular phones and the like, an electrical storage device combined with a solar battery such as a power storage power source for homes and factories or a power source for street lights, and a backup power source for traffic lights and traffic indicators on roads.

INDUSTRIAL APPLICABILITY

The power source device according to the present invention, the vehicle and the electrical storage device equipped with power source device can be suitably used as a large current power supply used for a power source of a motor that drives electric vehicles such as a hybrid vehicle, a fuel cell vehicle, an electric car, or an electric motorcycle. Examples include a power source device for a plug-in hybrid electric car and a hybrid electric car that can switch between an EV travelling mode and an HEV travelling mode, an electric car, and the like. The power source device according to the present invention, the vehicle and the electrical storage device equipped with power source device can also be appropriately used for applications including a backup power source device that can be equipped on a computer sever rack, a backup power source device for wireless base stations of cellular phones and the like, an electrical storage device combined with a solar battery such as a power storage power source for homes and for factories and a power source for street lights, and a backup power source for traffic lights.

REFERENCE MARKS IN THE DRAWINGS 100, 200, 700, 800, 900: power source device
1: battery cell
1X: terminal surface
1a: outer covering can
1b: sealing plate
1c: gas discharge valve
2: electrode terminal
10: battery stack
15: fastening member
15a: fastening main surface
15d: bent piece
15f: bolt
16: insulating spacer
17: end surface spacer
20: end plate
28: plate screw hole
29: bolt
30: insulating sheet
31: flat plate
32: bent covered part
38: gas duct
39: third cover
39a: fastening body
39b: intermediate part
39c: coupling piece
39d: fastening screw hole
40: cover assembly
41: first cover
42: second cover
43: first gas duct
44: second gas duct
46: lower cover
47: gas introduction port
48: baffle plate
49: intermediate plate
50: upper cover
51: communication hole
52: communication rib
53: rib for partition
60: reinforcement cover
61: bead
62: exposure part
70: total terminal strip
81: building
82: solar battery
83: charging circuit
84: charging switch
85: DC/AC inverter
86: load
87: discharging switch
88: power supply controller
91: vehicle body
93: motor
94: generator
95: DC/AC inverter
96: engine
97: wheel
98: charging plug
901: battery cell
902: spacer
903: end plate

904: bind bar
905: bolt
910: battery stack
GS: gas
BT1, BT1': first bent part
BT2, BT2': second bent part
W1: width of reinforcement cover
W2: width of coupling piece
HV, EV: vehicle

The invention claimed is:

1. A power source device comprising:
a battery stack in which a plurality of battery cells are stacked, each of battery cells including a gas discharge valve and an electrode terminal, the gas discharge valve configured to open when an internal pressure of an outer covering can of the battery cell rises, and the electrode terminal being disposed on an upper surface of the battery cell;
a pair of end plates that each include a plate shape including a main surface and a side surface intersecting the main surface, the side surface including a plate screw hole, the end plates being arranged on both side end surfaces of the battery stack;
a plurality of fastening members that are extended in a stack direction of the battery stack, each of the fastening members including a fastening screw hole opened at an end of the fastening members and coupling the pair of end plates to each other; and
a bolt that is inserted into a fastening screw hole of each of the fastening members and a plate screw hole of a corresponding one of the end plates to fix one of the fastening members to the corresponding one of the end plates,
wherein each of the plurality of fastening members includes
a fastening body in a plate shape,
an intermediate part bent with each of both ends of the fastening body, and
a coupling piece that is provided with a height difference from the fastening body by bending an end of the intermediate part far from the fastening body, and that is disposed with the fastening screw hole, and
wherein in the each of the plurality of fastening members, the coupling piece is narrower in width than the fastening main surface.

2. The power source device according to claim 1, wherein the fastening body and the coupling piece are arranged in parallel with different heights.

3. A power source device comprising:
a battery stack in which a plurality of battery cells are stacked, each of battery cells including a gas discharge valve and an electrode terminal, the gas discharge valve configured to open when an internal pressure of an outer covering can of the battery cell rises, and the electrode terminal being disposed on an upper surface of the battery cell;
a pair of end plates that each include a plate shape including a main surface and a side surface intersecting the main surface, the side surface including a plate screw hole, the end plates being arranged on both side end surfaces of the battery stack;
a plurality of fastening members that are extended in a stack direction of the battery stack, each of the fastening members including a fastening screw hole opened at an end of the fastening members and coupling the pair of end plates to each other;
a bolt that is inserted into a fastening screw hole of each of the fastening members and a plate screw hole of a corresponding one of the end plates to fix one of the fastening members to the corresponding one of the end plates,
a first cover that is provided on an upper surface of the battery stack and opens at a position corresponding to the gas discharge valve; and
a second cover that is provided on an upper surface of the first cover and defines a gas duct between the first cover and the second cover,
wherein each of the plurality of fastening members includes
a fastening body in a plate shape,
an intermediate part bent with each of both ends of the fastening body, and
a coupling piece that is provided with a height difference from the fastening body by bending an end of the intermediate part far from the fastening body, and that is disposed with the fastening screw hole, and
wherein the each of the plurality of fastening members includes a third cover that is metallic and provided on an upper surface of the second cover and abuts on the upper surface of the second cover.

4. The power source device according to claim 3, wherein the gas duct includes a baffle plate between the first cover and the second cover.

5. The power source device according to claim 3, wherein the third cover is fixed to the end plates.

6. The power source device according to claim 3, further comprising:
a bus bar that connects electrode terminals of the plurality of battery cells constituting the battery stack; and
a total terminal strip that is connected to the bus bar,
wherein the third cover includes an exposure part that exposes the total terminal strip.

7. The power source device according to claim 3, wherein the third cover includes a bead.

8. A vehicle comprising the power source device according to claim 1, the vehicle comprising:
the power source device;
a motor for travelling to which the power source device supplies electric power;
a vehicle body equipped with the power source device and the motor; and
a wheel driven by the motor to cause the vehicle body to travel.

9. An electrical storage device comprising the power source device according to claim 1, the electrical storage device comprising:
the power source device; and
a power supply controller that controls charging and discharging of the power source device,
wherein the power supply controller enables charging of the plurality of battery cells with electric power from outside, and controls charging to be performed on the plurality of battery cells.

* * * * *